US012075458B2

(12) United States Patent
Zhao et al.

(10) Patent No.: US 12,075,458 B2
(45) Date of Patent: Aug. 27, 2024

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Youping Zhao, Beijing (CN); Lu Shi, Beijing (CN); Chen Sun, Beijing (CN); Xin Guo, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 503 days.

(21) Appl. No.: 17/293,480

(22) PCT Filed: Dec. 16, 2019

(86) PCT No.: PCT/CN2019/125562
§ 371 (c)(1),
(2) Date: May 13, 2021

(87) PCT Pub. No.: WO2020/125575
PCT Pub. Date: Jun. 25, 2020

(65) Prior Publication Data
US 2022/0053505 A1  Feb. 17, 2022

(30) Foreign Application Priority Data

Dec. 21, 2018 (CN) .......................... 201811571709.1

(51) Int. Cl.
H04W 72/02 (2009.01)
H04W 16/10 (2009.01)
(Continued)

(52) U.S. Cl.
CPC .......... H04W 72/56 (2023.01); H04W 16/10 (2013.01); H04W 16/14 (2013.01); H04W 72/0453 (2013.01)

(58) Field of Classification Search
None
See application file for complete search history.

(56) References Cited

U.S. PATENT DOCUMENTS 9,380,594 B1 * 6/2016 Malmirchegini ..... H04W 24/08
10,405,190 B2 * 9/2019 Khoshnevisan .. H04W 72/0453
(Continued)

FOREIGN PATENT DOCUMENTS

CN   102857306 A   1/2013
CN   104754747 A   7/2015
(Continued)

OTHER PUBLICATIONS

Imtiaz Parvez, et al., "CBRS Spectrum Sharing between LTE-U and WiFi: A Multiarmed Bandit Approach", Hindawi, Mobile Information Systems, vol. 2016, Jan. 1, 2016, 13 pages, XP055416156.
(Continued)

Primary Examiner — Duc T Duong
(74) Attorney, Agent, or Firm — XSENSUS LLP

(57) ABSTRACT

Provided are an electronic device and method for wireless communication, and a computer-readable storage medium. The electronic device comprises: a processing circuit configured to acquire, from a frequency spectrum management device, a channel priority parameter for a specific channel, wherein the channel priority parameter is used for instructing a resource application system to use the specific channel as the priority level of an extended channel; and selecting the extended channel of the resource application system at least based on the channel priority parameter.

15 Claims, 14 Drawing Sheets

(51) Int. Cl.
  *H04W 16/14* (2009.01)
  *H04W 72/04* (2023.01)
  *H04W 72/0453* (2023.01)
  *H04W 72/56* (2023.01)

(56) References Cited

U.S. PATENT DOCUMENTS

| | | | |
|---|---|---|---|
| 2006/0215611 A1 | 9/2006 | Nakagawa | |
| 2010/0240407 A1* | 9/2010 | Park | H04W 72/00 455/512 |
| 2014/0016578 A1 | 1/2014 | Lee | |
| 2015/0005022 A1* | 1/2015 | El-Refaey | H04W 16/14 455/509 |
| 2015/0119059 A1* | 4/2015 | Miao | H04W 16/14 455/452.1 |
| 2015/0373554 A1* | 12/2015 | Freda | H04W 16/14 455/450 |
| 2016/0330743 A1 | 11/2016 | Das et al. | |
| 2017/0078889 A1 | 3/2017 | Sun | |
| 2017/0290037 A1 | 10/2017 | Goel et al. | |
| 2018/0014317 A1* | 1/2018 | Gulati | H04L 5/0005 |
| 2018/0132112 A1 | 5/2018 | Khoshnevisan | |
| 2018/0132198 A1* | 5/2018 | Zhang | H04W 56/001 |
| 2019/0014582 A1* | 1/2019 | Yogev | H04W 16/14 |
| 2019/0037537 A1* | 1/2019 | Hassan | H04W 72/04 |
| 2019/0069201 A1* | 2/2019 | Hassan | H04W 16/14 |
| 2020/0092731 A1* | 3/2020 | Beck | H04W 48/16 |
| 2020/0187098 A1* | 6/2020 | Dhillon | H04W 16/16 |
| 2021/0289513 A1* | 9/2021 | Hafeez | H04W 72/0453 |

FOREIGN PATENT DOCUMENTS

| | | |
|---|---|---|
| CN | 106162913 A | 11/2016 |
| CN | 106559795 A | 4/2017 |
| CN | 107241736 A | 10/2017 |
| CN | 108024363 A | 5/2018 |
| CN | 108601091 A | 9/2018 |
| JP | H04342322 A | 11/1992 |
| JP | 2015506604 A | 3/2015 |
| JP | 2017130778 A | 7/2017 |
| WO | 2018/082415 A1 | 5/2018 |
| WO | 2018/087663 A1 | 5/2018 |
| WO | WO-2018118398 A1 | 6/2018 |
| WO | 2018/211337 A1 | 11/2018 |

OTHER PUBLICATIONS

Huawei, Hisilicon, "Group and logical channel priorities for ProSe communication", R2-151340, 3GPP TSG-RAN WG2 Meeting #89bis, Bratislava, Slovakia, Apr. 20-24, 2015, pp. 1-4.

ZTE, "Mapping of logical channels to component carriers", R2-095671, 3GPP TSG RAN WG2 #67 bis, Miyazaki, Japan, Oct. 12-16, 2009, pp. 1-9.

International Search Report and Written Opinion mailed on Feb. 26, 2020 received for PCT Application No. PCT/CN2019/125562, Filed on Dec. 16, 2019, 9 pages including English Translation.

Ericsson, "Candidate Spectrum for NR Unlicensed Operation", 3GPP TSG RAN WG1 Meeting #92 R1-1802773, Feb. 26-30, 2018, 5 Pages.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

This application is based on PCT filing PCT/CN2019/125562, filed Dec. 16, 2019, which claims the priority to Chinese Patent Application No. 201811571709.1, titled "ELECTRONIC DEVICE AND METHOD FOR WIRELESS COMMUNICATION, AND COMPUTER-READABLE STORAGE MEDIUM", filed on Dec. 21, 2018 with the China National Intellectual Property Administration, each of which is incorporated herein by reference in its entirety.

FIELD

The present disclosure relates to the field of wireless communication technology, and in particular to spectrum management technology. More particularly, the present disclosure relates to an electronic apparatus and a method for wireless communications, and a computer-readable storage medium.

BACKGROUND

With development of wireless communication technology, a large amount of spectrum resources are required to support new service arising continuously, and to meet requirements for high-speed communications, causing more and more shortage of spectrum resources. At present, limited spectrum resources have been assigned to fixed operators and services, and new available spectrum is quite rare or expensive in price. In this case, a concept of dynamic spectrum utilization is proposed, that is, spectrum resources which have been assigned to certain services but are not fully utilized are utilized dynamically.

For example, the Federal Communications Commission (FCC) has made the 150 MHz spectrum (3350~3700 MHz) in the 3.5 GHz frequency band open for commercial use in US in the name of "Citizens Broadband Radio Service (CBRS)". The CBRS implements a three-level shared framework by means of a Spectrum Access System (SAS), including: existing users with the highest priority level, such as the government or military communication equipment, i.e., the first level users (Incumbent Access users); the second level users with Priority Access License (PAL); and the third level users with General Authorized Access (GAA). The main functional entities in the SAS include Citizens Broadband Radio Service Devices (CBSD) and an End User Device (EUD).

At present, the FCC has formulated relatively complete rules for protection of the first level users and the second level users, but there are no definite rules for spectrum sharing among GAA users. The CBRS Alliance, formed by multiple companies, divides the spectrum assignment process among CBSD of the GAA users into two parts: assigning a primary channel using an interference overlapping map; and allowing spectrum extension of CBSD, that is, assigning an extended channel for CBSD, so as to improve spectral efficiency. Spectrum extension can maintain the stability of the primary channel assignment on the one hand and assist reassignment of primary channels on the other hand.

In a scenario of ultra-dense network, in view of the frequent change of the load on most of CBSDs, it is required to perform dynamic spectrum extension to support the dynamic change of CBSDs' load. FIG. 1 shows a schematic diagram of an exemplary scenario under the SAS shared framework. Referring to FIG. 1, in hot spots such as a shopping mall or a gymnasium, load on CBSDs may change differently at different timings. In some extreme cases, the load may grow out of nothing or change in an opposite way. In order to cope with this kind of change, CBSD may request extended spectrum from the Coexistence Manager (CxM) to support the dynamically increasing load.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry configured to: acquire, from a spectrum management device, a channel priority level parameter for a particular channel, the channel priority level parameter being used for indicating a priority level at which the particular channel is used by a resource utilization system as an extended channel; and select, at least based on the channel priority level parameters, an extended channel for the resource utilization system.

A method for wireless communications is provided according to another aspect of the present disclosure. The method includes: acquiring, from a spectrum management device, a channel priority level parameter for a particular channel, the channel priority level parameter being used for indicating a priority level at which the particular channel is used by a resource utilization system as an extended channel; and selecting, at least based on the channel priority level parameters, an extended channel for the resource utilization system.

An electronic apparatus for wireless communications is provided according to an aspect of the present disclosure. The electronic apparatus includes processing circuitry configured to: generate, in a case that there is conflict between extended channels requested by two or more resource utilization systems with interfering relationship therebetween within a management range of a spectrum management device, a channel priority level parameter for the extended channel subjected to the conflict for the two or more resource utilization systems, respectively, wherein the channel priority level parameter is used to indicate a priority level at which the extended channel is used by a corresponding resource utilization system; and provide the channel priority level parameter to the corresponding resource utilization system.

A method for wireless communications is provided according to another aspect of the present disclosure. The method includes: generating, in a case that there is conflict between extended channels requested by two or more resource utilization systems with interfering relationship therebetween within a management range of a spectrum management device, a channel priority level parameter for the extended channel subjected to the conflict for the two or more resource utilization systems, respectively, wherein the channel priority level parameter is used to indicate a priority level at which the extended channel is used by a corresponding resource utilization system; and providing the channel priority level parameter to the corresponding resource utilization system.

The electronic apparatus and the method according to the above aspects of the present disclosure can realize dynamic assignment of an extended channel, and achieve effective coordination in a case of conflict of extended channels among multiple resource utilization systems, thereby reducing conflicts due to channel contention and improving the spectrum utilization efficiency.

An electronic apparatus for wireless communications is provided according to an aspect of the present disclosure. The electronic apparatus includes processing circuitry configured to: determine a distribution of spectrum extension performed by resource utilization systems managed by a spectrum management device within a predetermined period of time; and calculate, based on the distribution, a primary channel reassignment factor, for judging whether to perform reassignment of primary channels.

A method for wireless communications is provided according to another aspect of the present disclosure. The method includes: determining a distribution of spectrum extension performed by resource utilization systems managed by a spectrum management device within a predetermined period of time; and calculating, based on the distribution, a primary channel reassignment factor, for judging whether to perform reassignment of primary channels.

The electronic apparatus and the method according to the above aspects of the present disclosure can determine whether to perform reassignment of primary channels based on overall conditions of spectrum extension, thereby improving the effectiveness of spectrum assignment.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION

Figure 1:
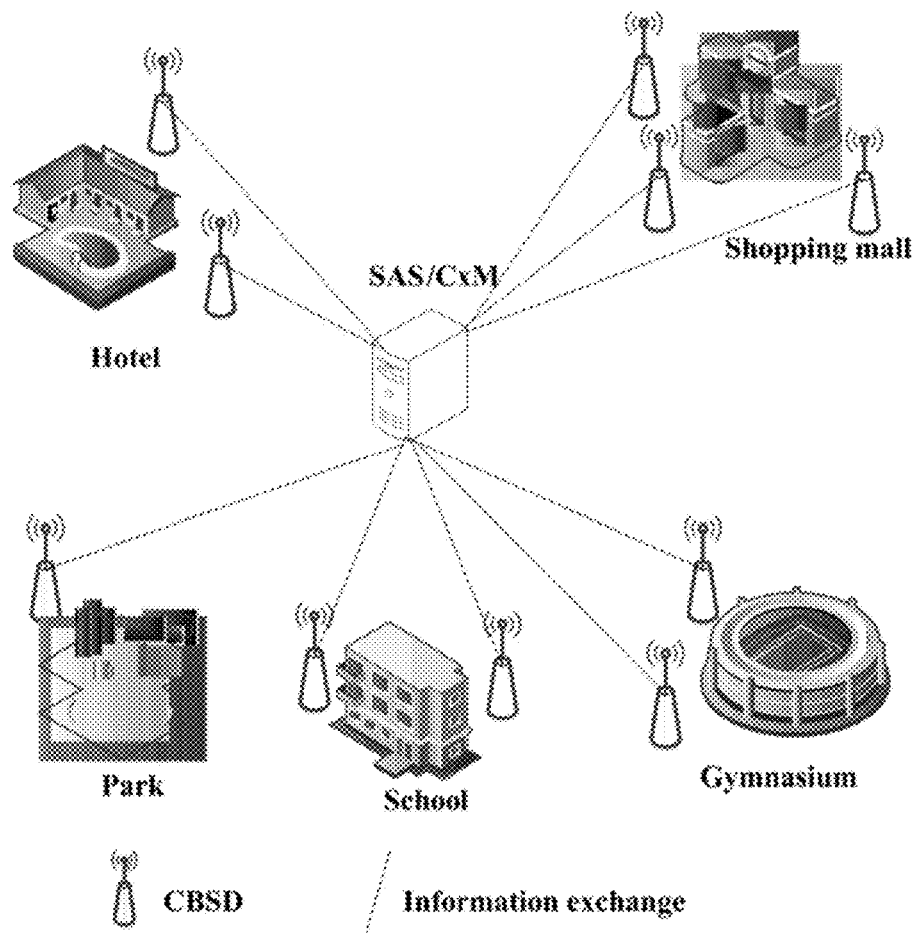
FIG. 1 is a schematic diagram of an exemplary scenario under the SAS shared framework.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

In a scenario of co-existence, specific spectrum may be dynamically utilized among different wireless communication systems (either same type of wireless communication systems employing the same radio access technology, or different types of wireless communication systems employing different radio access technologies), and the dynamic utilization of the spectrum is required to be managed. For example, a central management device or a spectrum management device may be provided to manage the utilization of spectrum by wireless communication systems within the management region thereof. Herein, the wireless communication systems are also referred to as resource utilization systems. For example, a resource utilization system may include a base station and user equipment. Taking the SAS shared framework defined by CBRS as an example, the resource utilization system may include CBSD and/or EUD.

Within the management range of the central management device or the spectrum management device, there are generally multiple resource utilization systems. The central management device assigns available spectrum resources among the resource utilization systems reasonably to ensure the efficiency and fairness of resource utilization. In the following description, reference may be made to the shared framework of CBRS, but it should be understood that the technology of the present disclosure is not limited to being applied to CBRS, and may be applied to any scenario where multiple resource utilization systems are within the same geographic range or where spectrum resources are required to be assigned among the multiple resource utilization systems.

As mentioned above, in a case where a resource utilization system is assigned a primary channel, the resource utilization system may be assigned an extended channel so as to maintain the communication quality, when the load on the resource utilization system increases such that the spectrum resources of the primary channel cannot meet the requirements. Therefore, the strategy for selecting an extended channel is important with respect to improving network performance. A scheme for selecting an extended channel is provided according to the embodiment.

Figure 2:
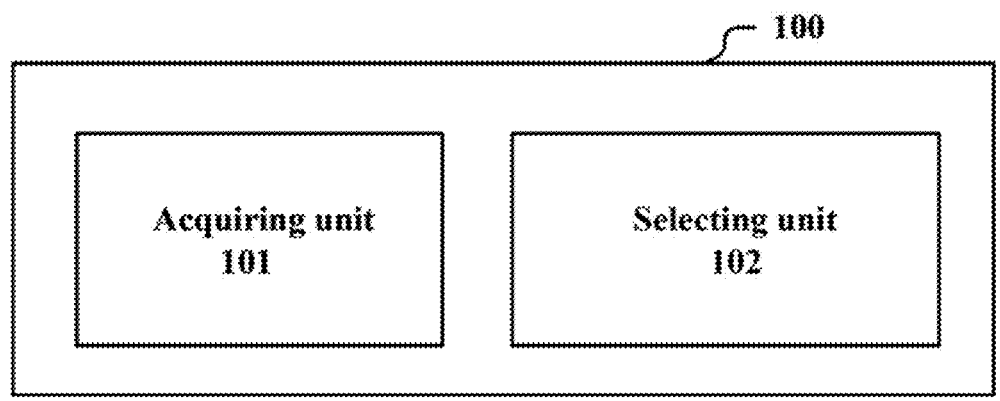
FIG. 2 is a block diagram showing functional modules of an electronic apparatus for wireless communications according to an embodiment of the present disclosure.

FIG. 2 is a block diagram showing functional modules of an electronic apparatus 100 for wireless communications according to an embodiment of the present disclosure. As shown in FIG. 2, the electronic apparatus 100 includes an acquiring unit 101 and a selecting unit 102. The acquiring unit 101 is configured to acquire, from a spectrum management device, a channel priority level parameter for a particular channel, the channel priority level parameter being used for indicating a priority level at which the particular channel is used by a resource utilization system as an extended channel. The selecting unit 102 is configured to select, at least based on the channel priority level parameter, an extended channel for the resource utilization system.

The acquiring unit 101 and the selecting unit 102 may be implemented by one or more processing circuitries, which may be implemented as a chip, for example. Moreover, it should be understood that various functional units in the apparatus shown in FIG. 2 are only logical modules divided based on their specific functions, and are not intended to limit a specific implementation. The same applies to examples of other electronic apparatuses to be described later.

The electronic apparatus 100, for example, may be arranged at a base station side of a resource utilization system, or communicatively connected to a base station (a CBSD, for example). It is further to be noted that the electronic apparatus 100 may be implemented in a chip level or an apparatus level. For example, the electronic apparatus 100 may serve as a base station itself, and may include an external device such as a memory and a transceiver (not shown). The memory may be configured to store programs required for performing various functions by the base station and related data information. The transceiver may include one or more communication interfaces to support communications with different apparatus (for example, user equipment, another base station and so on). The specific implementation of the transceiver is not limited herein.

For example, the electronic apparatus 100 requests to the spectrum management device to use a particular channel as its extended channel. In a case where another resource utilization system also requests to use the particular channel as the extended channel, the spectrum management device sets channel priority level parameters for the particular channel with regard to the present resource utilization system and the other resource application system, so that the priority level of using the particular channel as the extended channel is distinguished among the resource utilization systems and/or among multiple channels.

The spectrum management device described herein may be implemented as various functional entities, such as SAS or CxM in the aforementioned CBRS architecture, or may be a Group Spectrum Coordinator (GSC), but is not limited thereto.

The channel priority level parameter in the embodiment may have various forms or values, which, for example, may depend on the selection strategy adopted by the selecting unit 102 and/or the manner in which the spectrum management device sets the channel priority level parameter. In the present disclosure, channels that can be used as the extended channel are referred to as candidate channels. The selecting unit 102 selects an extended channel from the candidate channels. It can be understood that the particular channel is one of the candidate channels.

The selecting unit 102 may, for example, be further configured to determine a range of the candidate channels. Specifically, the selecting unit 102 may determine the candidate channels in various ways, for example, in one of the following ways: determining the candidate channels based on an instruction from the spectrum management device, that is, the candidate channels are indicated by the spectrum management device through signaling; determining a predetermined number of channels on both sides centered on a primary channel of the resource utilization system as the candidate channels, where the predetermined number may be a fixed value, or a value set by the spectrum management device, or a value determined by the resource utilization system based on a specific factor, etc; and determining all channels available to the spectrum management device other than the primary channel, as the candidate channels.

In an example, the acquiring unit 101 is further configured to perform an initialization operation to initialize the channel priority level parameter for each of a plurality of candidate channels to a predetermined value. When a channel priority level parameter for the particular channel is acquired by the acquiring unit 101, the channel priority level parameter for the particular channel is updated.

In an example, the selecting unit 102 updates a channel evaluation value for the particular channel at least with the channel priority level parameter for the particular channel, and selects an extended channel based on the channel evaluation value, the channel evaluation value indicating performance of the particular channel serving as an extended channel. For example, the selecting unit 102 may select the candidate channel with the highest channel evaluation value as the extended channel. For example, the channel evaluation value may be related to the interference evaluation for the candidate channel, and may also be related to the historical frequency that the corresponding candidate channel is selected as the extended channel. Specifically, the channel evaluation value or at least a part thereof for the particular channel may, for example, be weighted by the channel priority level parameter for the particular channel.

Therefore, since the channel priority level parameter for the particular channel may affect the channel evaluation value for the particular channel, the selecting unit 102, when selecting an extended channel from among the candidate channels again, may make a decision different from the previous selection, thereby avoiding channel contention.

Figure 3:
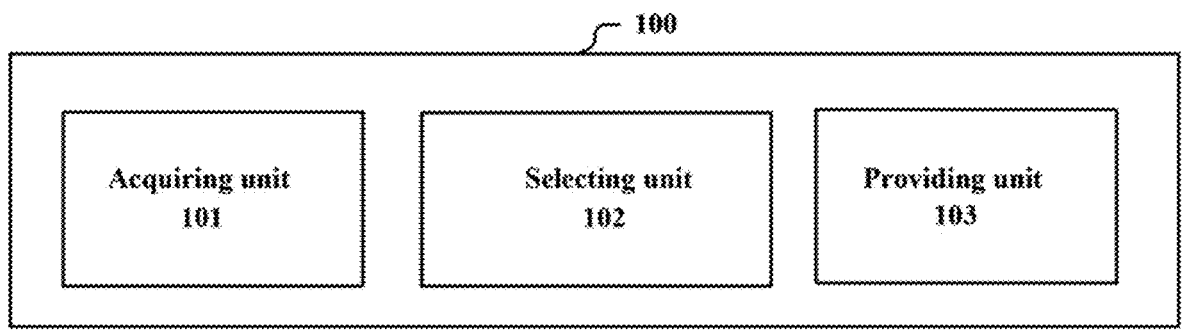
FIG. 3 is another block diagram showing functional modules of an electronic apparatus for wireless communications according to an embodiment of the present disclosure.

As shown in FIG. 3, the electronic apparatus 100 may further include a providing unit 103, configured to provide information of the selected extended channel to the spectrum management device. In addition, in a case that the selected extended channel conflicts with an extended channel selected by another resource utilization system, the acquiring unit 101 acquires an updated channel priority level parameter for the selected extended channel from the spectrum management device. The conflict mentioned herein means that there are two or more resource utilization systems, with interfering relationship therebetween, requesting the same extended channel simultaneously.

The providing unit 103 may provide, to the spectrum management device, an identification of the selected extended channel, and additionally one or more of the following: emission power of the resource utilization system, the historical number of times that the selected extended channel is selected, and measured signal power of the resource utilization system on the selected extended channel. Such information may be used by the spectrum management device to set a channel priority level parameter for a corresponding extended channel.

The selecting unit 102 selects, based at least on the acquired updated channel priority level parameter, an extended channel until the selected extended channel does not conflict with the extended channel selected by any other resource utilization system. In other words, the acquiring unit 101 performs the above process of acquiring an updated channel priority level parameter, the selecting unit 102 performs the process of selecting an extended channel based on the updated channel priority level parameter, and the providing unit 103 performs the process of providing information of the selected extended channel to the spectrum management device. The above series processes are performed until there is no conflict on the selected extended channel and thus the resource utilization system can use the selected extended channel.

As mentioned above, the channel priority level parameter for a particular channel may be used to calculate a channel evaluation value for the particular channel, and the selecting unit 102 selects an extended channel by comparing the channel evaluation values for respective candidate channels. For ease of understanding, examples of processing performed by the selecting unit 102 and channel evaluation values are given below. However, these examples are for illustrative purposes only and are not restrictive.

In an example, the selecting unit 102 may select the extended channel using a Multi-Armed Bandit (MAB) algorithm. Specifically, the selecting unit 102 determines a reward value of a candidate channel in the algorithm by measuring the signal power on the candidate channel, calculates a channel evaluation value for the candidate channel based on the reward value, the frequency that the candidate channel is selected, and the channel priority level parameter for the candidate channel, and selects the extended channel based on the channel evaluation value. The channel evaluation value indicates performance of the candidate channel serving as the extended channel.

Figure 4:
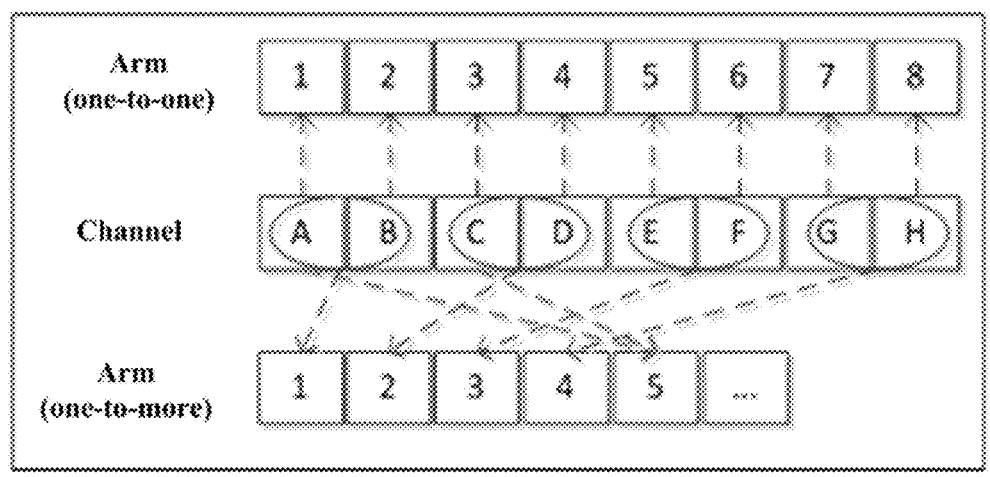
FIG. 4 is a schematic diagram of the correspondence between channels and arms in the multi-armed bandit algorithm.
Figure 5:
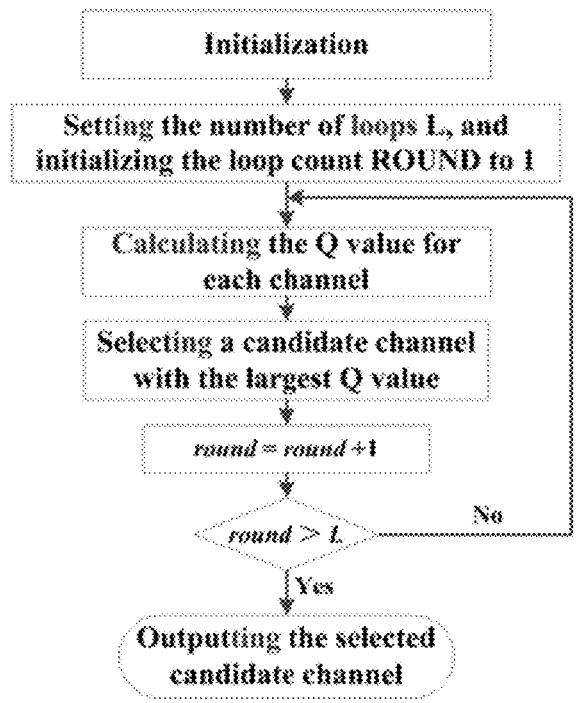
FIG. 5 is an exemplary flow chart of the multi-armed bandit algorithm.

The resource utilization system represents a player in the MAB algorithm. The player may choose different arms, which correspond to candidate channels. For each of the arms, a Q value for selecting the arm, that is, a channel evaluation value, may be calculated. FIG. 4 shows the correspondence between candidate channels and arms in the MAB algorithm. It can be seen that one arm may correspond to either one candidate channel (i.e., one-to-one) or multiple channels (i.e., one-to-more). In a case of one-to-more correspondence, one arm may correspond to multiple continuous channels in the frequency domain, or correspond to multiple discontinuous channels in the frequency domain. FIG. 5 shows an example of a flow chart of the algorithm.

First, initialization is performed. At this stage, for each of the candidate channels, the selecting unit 102 measures a signal power on the candidate channel and determines a reward value based on the signal power. For example, assuming that there are K candidate channels in total, the signal power on the $j^{th}$ candidate channel is denoted as $p_j$ (including noise power and co-channel interference power), the reward value on the $j^{th}$ candidate channel may be denoted as $r_j=u(p_j)$, where the function $u(\cdot)$ represents the relationship between $p_j$ and $r_j$. As an example, the reward value may be calculated as follows: $r_j=-\log_{10}(p_j)$. In the case that the resource utilization system is an LTE system, the measurement result of the reference signal strength indicator (RSSI) may be used as the signal power $p_j$.

Next, the number of exploration loops L of the algorithm is set, and the loop count round is initialized to 1. After that, L loops are executed, and in each loop, a channel evaluation value (i.e., the Q value) for each candidate channel is first calculated. For example, the Q value of the $j^{th}$ candidate channel may be calculated in following equation (1).

$$Q_j = \bar{r}_j + \sqrt{\frac{2\delta_j \ln n}{n_j}} \quad (1)$$

Where $Q_j$ represents a Q value on the $j^{th}$ candidate channel, $\bar{r}_j$ is an average reward value on the $j^{th}$ candidate channel, $n_j$ is the number of times that the $j^{th}$ candidate channel is selected, n is the total number of times that candidate channels are selected, and $\delta_j$ is the channel priority level parameter for the $j^{th}$ candidate channel. The channel priority level parameter for each candidate channel may be initialized to a predetermined value when the channel priority level parameters are not received from the spectrum management device. The predetermined value may be the same or different for all candidate channels. In addition, since each channel may be regarded as having been selected once during the initialization, in the first loop, $n_j=1$ for j=1, ..., L, n is equal to L+1, and $\bar{r}_j$ represents a reward value calculated in the initialization stage.

Then, the selecting unit 102 selects a candidate channel with the largest Q value as a selection result in the current loop. The signal power on the selected candidate channel is measured for use in calculation of Q value in the next loop. Since the signal power on only one candidate channel is measured in the loop, the overhead for measurement can be reduced. It can be seen from equation (1) that the first term for the Q value is related to interferences. The smaller the interferences on the candidate channel, the larger the value of the first term for the Q value, that is, a candidate channel with less interferences is tended to be selected as the extended channel. Besides, the second term for the Q value is related to the frequency that the candidate channel is selected as the extended channel. The higher the frequency, the smaller the second term for the Q value, that is, a candidate channel that is less selected before is tended to be selected as the extended channel. Therefore, influence from the two factors is taken into consideration for a final selection result of the selecting unit 102.

Next, round is increased by 1, and the flow proceeds to a next loop if the increased round does not exceed the maximum number of loops L. On the other hand, if the increased round exceeds the maximum number of loops, it means that the current loop is the last loop. The candidate channel with the largest Q value that is selected in the current loop is used as the finally selected extended channel, and is output.

As described above, the providing unit 103 provides information of the finally selected extended channel (for example, the $i^{th}$ candidate channel) to the spectrum management device. If there is no conflict, the spectrum management device assigns the requested extended channel to the present resource utilization system. Otherwise, the spectrum management device issues an updated channel priority level parameter $\delta_i$ for the extended channel.

In the latter case, the selecting unit 102 uses the $\delta_i$ received from the spectrum management device to update the channel priority level parameter for the $i^{th}$ candidate channel, and then repeats the flow of FIG. 5 to re-select an extended channel. In addition, in some cases, for example, in a case where the network status changes slowly, the selecting unit 102 may use the Q values for other candidate channels obtained previously by executing the flow shown in FIG. 5, calculate the Q value of the $i^{th}$ candidate channel based on the previously stored $\bar{r}_i$, $n_i$, n, and the updated $\delta_i$, and select the candidate channel with the largest Q value as the extended channel. In this way, the measurement overhead can be further reduced.

The information reported by the providing unit 103 to the spectrum management device may include, for example, identification of the selected extended channel, the number of times that the selected channel is selected, measured signal power on the selected channel, the expected emission power of the resource utilization system, and the like.

In another example, the selecting unit 102 may select the extended channel by sorting the channel evaluation values of the candidate channels using a sorting algorithm. In this example, a Q value may be calculated by the following equation (2):

$$Q_j = \delta_j \bar{r}_j \quad (2)$$

where symbols have the same definition as in equation (1). In initialization, channel priority level parameters for respective candidate channels may be set to predetermined values, such as 1. In addition, similarly, the number of loops may be set to L. A reward value on each of the candidate channels may be measured in each loop, and $\bar{r}_j$ may be obtained at the end of the loop. The selecting unit 102 sorts the Q values, and selects the candidate channel with the largest Q value as the extended channel. The providing unit 103 reports information of the extended channel to the spectrum management device. In addition, the providing unit 103 may also provide other information to the spectrum management device, such as the signal power on the extended channel, the expected emission power of the resource utilization system, and the like.

In a case that the reported extended channel conflicts with an extended channel requested by another resource utilization system, the spectrum management device provides a channel priority level parameter for the selected extended channel. The selecting unit 102 updates the channel priority level parameter for the selected extended channel accordingly, and reselects an extended channel. Similar to the previous example, when the network status changes slowly, the selecting unit 102 may use an average reward value that is previously measured to recalculate only a channel evaluation value for the last selected extended channel according to equation (2). When the network status changes rapidly, the selecting unit 102 needs to measure and average the reward values again so as to update channel evaluation values for the candidate channels.

Information about the change status of the network may be acquired by the acquiring unit 101 from the spectrum management device, for example, together with the channel priority level parameter.

Figure 6:
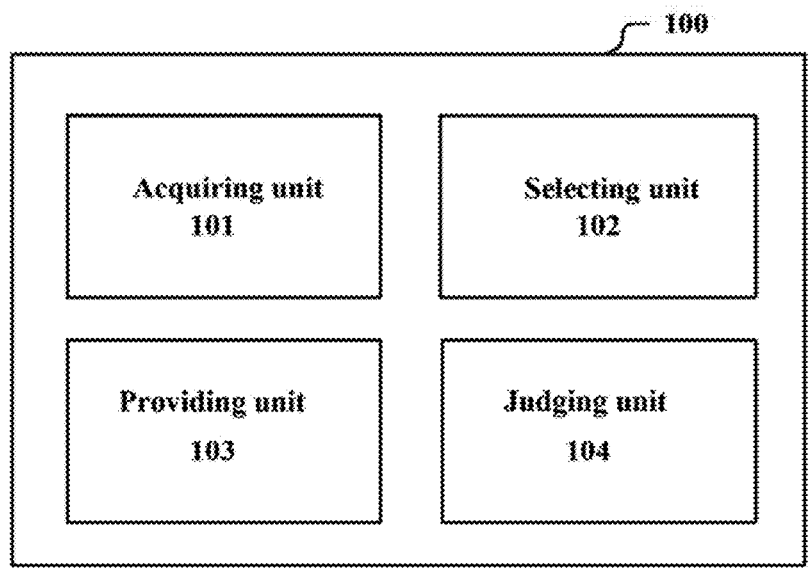
FIG. 6 is another block diagram showing functional modules of an electronic apparatus for wireless communications according to an embodiment of the present disclosure.

In addition, as shown in FIG. 6, the electronic apparatus 100 may further include a judging unit 104 configured to determine whether a resource utilization system needs an extended channel. The judging unit 104 may make a judgment based on a predetermined performance index.

In an example, the judging unit 104 may judge based on communication quality and spectrum satisfaction degree of the resource utilization system. The spectrum satisfaction degree may be expressed by, for example, a ratio of the number of assigned channels to the number of expected channels. The communication quality may be expressed by, for example, a signal-to-interference-and-noise ratio (SINR).

For example, the judging unit 104 may judge that the resource utilization system needs an extend channel in the following situation: the weighted sum of spectrum satisfaction degree and communication quality being lower than a predetermined threshold; and the duration of the state in which the weighted sum is lower than the predetermined threshold exceeding a predetermined duration.

The following equation (3) shows a performance index p used by the judging unit 104 for judgment in this example:

$$p = \omega_1 p_s + \omega_2 p_r \tag{3}$$

where p may be referred to as utility of a resource utilization system, $p_s$ represents the spectrum satisfaction degree, $p_r$ represents the SINR, and $\omega_1$ and $\omega_2$ represent weights of different factors, $\omega_1 + \omega_2 = 1$.

The judging unit 104 judges that the resource utilization system needs an extended channel when the following equation (4) is satisfied.

$$p < p^{th} \text{ and } \tau_p < p^{th} > \tau^{th} \tag{4}$$

Where $p^{th}$ is a predetermined threshold, $\tau^{th}$ is a predetermined duration, and $\tau_p < p^{th}$ represents a duration in which $p < p^{th}$. By making judgments using equation (4), frequent and unnecessary spectrum extension may be avoided, and the overall utilization efficiency of spectrum resources is improved.

In summary, the electronic apparatus 100 according to the embodiment can dynamically select an extended channel, and can re-select in a case of conflicts of extended channels of multiple resource utilization systems occurring, which reduces conflicts for channel contention and improves the spectrum utilization efficiency. In addition, since each resource utilization system selects an extended channel in parallel in a distributed manner, the time overhead of decision-making can be reduced.

Second Embodiment

Figure 7:
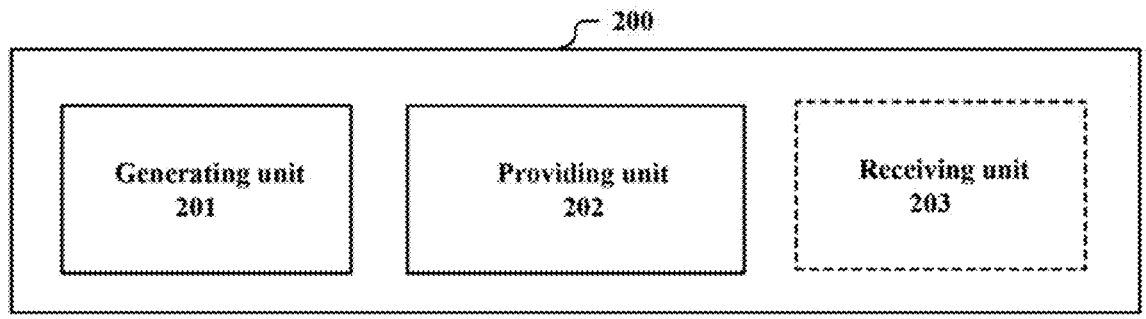
FIG. 7 is a block diagram showing functional modules of an electronic apparatus for wireless communications according to another embodiment of the present disclosure.

FIG. 7 is a block diagram showing functional modules of an electronic apparatus 200 for wireless communications according to another embodiment of the present disclosure. As shown in FIG. 7, the electronic apparatus 200 includes a generating unit 201 and a providing unit 202. The generating unit 201 is configured to generate, in a case that there is conflict between extended channels requested by two or more resource utilization systems with interfering relationship therebetween within a management range of a spectrum management device, a channel priority level parameter for the extended channel subjected to the conflict for the two or more resource utilization systems, respectively, wherein the channel priority level parameter is used to indicate a priority level at which the extended channel is used by a corresponding resource utilization system. The providing unit 202 is configured to provide the channel priority level parameter to the corresponding resource utilization system.

The generating unit 201 and the providing unit 202 may be implemented by one or more processing circuitries. A processing circuitry may be implemented as a chip, for example.

The electronic apparatus 200 may be arranged, for example, on a central management device side or the spectrum management device side, or may communicatively connected to the central management device or the spectrum management device. In addition, the electronic apparatus 200 may be arranged on the core network side. The central management device or spectrum management device described herein may be implemented as various functional entities, such as SAS, CxM or GSC in the above described CBRS architecture. In the CBRS architecture, it may also be configured that the SAS implements a part of the functions of the electronic apparatus 200, and the CxM implements another part of the functions of the electronic apparatus 200, and the like. It should be understood that these are not limiting.

It should also be noted that the electronic apparatus 200 may be implemented at the chip level, or may also be implemented at the device level. For example, the electronic apparatus 200 may operate as the central management device or the spectrum management device itself, and may also include external devices such as a memory, a transceiver (not shown in the figure). The memory may be used to store programs required to be executed by the central management device or the spectrum management device to realize various functions and related data information. The transceiver may include one or more communication interfaces to support communication with different devices (for example, a base station, other central management device or spectrum management device, user equipment, etc.), and the implementation of the transceiver is not specifically limited herein.

In a case of conflict between extended channels, the generating unit 201 generates a channel priority level parameter for the extended channel by, for example, considering the overall situation of the resource utilization systems within the management range.

In an example, the generating unit 201 generates a channel priority level parameter for each of two or more resource utilization systems based on one or more of the following: a random factor, a degree of requirement for the extended channel by the resource utilization system, channel continuity between the extended channel and a primary channel of the resource utilization system, and communication quality of the resource utilization system on the extended channel.

For example, the degree of requirement for the extended channel by the resource utilization system is represented by a ratio of the historical number of times that the resource utilization system selects the extended channel to a sum of respective historical numbers of times that the two or more resource utilization systems select the extended channel. The two or more resource utilization systems are also referred to as a sub-connected set. Information about historical times may be reported by respective resource utilization systems. The larger the above-mentioned ratio is, the higher the degree of requirement for the extended channel by the corresponding resource utilization system is, so that the channel priority level parameter for the resource utilization system may be set higher, for example.

The channel continuity between the extended channel and a primary channel of the resource utilization system may be represented by a frequency interval between the extended channel and the primary channel. The larger the frequency interval is, the worse the channel continuity is, so that the channel priority level parameter for the corresponding resource utilization system may be set lower, for example.

The communication quality of the resource utilization system on an extended channel may, for example, be represented by a ratio of the expected emission power of the resource utilization system to the measured signal power of the resource utilization system on the extended channel. The larger the ratio is, the better the communication quality of the corresponding resource utilization system on the extended channel is, so that the channel priority level parameter for the resource utilization system may be set higher, for example.

The following equation (5) shows an example of the channel priority level parameter, $$\delta_{ij} = \frac{k}{m} \cdot \frac{n_{ij}}{\sum_{t=1}^{m} n_{ij}} \cdot \frac{1}{N_{it}} \cdot \frac{p_{it}}{p_{ij}} \quad (5)$$

where $\delta_{ij}$ is a channel priority level parameter for the $i^{th}$ resource utilization system on the $j^{th}$ candidate channel (which is selected as an extended channel), m is the number of resource utilization systems within the sub-connected set where the resource utilization system is located, k is a random number between 1 and m, $n_{ij}$ is the number of times that the $j^{th}$ candidate channel is selected by the $i^{th}$ resource utilization system, Nit is the frequency interval between the primary channel of the $i^{th}$ resource utilization system and the requested extended channel, Pit is expected emission power of the $i^{th}$ resource utilization system, and $p_{ij}$ is measured signal power of the $i^{th}$ resource utilization system on the $j^{th}$ candidate channel. It can be seen that, in equation (5), the first term represents a random number, the second term represents a degree of requirement for the $j^{th}$ candidate channel by the $i^{th}$ resource utilization system, the third term represents the channel continuity, and the fourth term represents an estimated SINR in the case that the $i^{th}$ resource utilization system selects the $j^{th}$ candidate channel as the extended channel. It should be understood that equation (5) is only an example, and in practice, any one or more terms of equation (5) may be used to calculate the channel priority level parameter.

When the generating unit 201 calculates $\delta_{ij}$, the providing unit 202 provides it to a corresponding resource utilization system. In addition, the providing unit 202 may also provide the resource utilization system with information about a change status of network, so that the resource utilization system determines how to use the updated channel priority level parameter to select an extended channel based on the change status of network. Specific details have been given in the first embodiment and will not be repeated hereinafter.

In addition, the providing unit 202 may also provide the resource utilization system it manages with an indication of the range of candidate channels that may be used as an extended channel.

As shown by a dashed line block in FIG. 7, the electronic apparatus 200 may further include a receiving unit 203 configured to receive, from a resource utilization system, a request for extended channel, which includes information of a channel that is selected as the extended channel by the resource utilization system.

In addition, the extended channel request also includes one or more of the following: expected emission power of the resource utilization system, the historical number of times that the extended channel is selected, measured signal power of the resource utilization system on the extended channel, and the like. Such information may be used in calculation of a channel priority level parameter.

In a case that the extended channel requested by the resource utilization system does not conflict with others, the spectrum management device assigns the extended channel to the resource utilization system.

Figure 8:
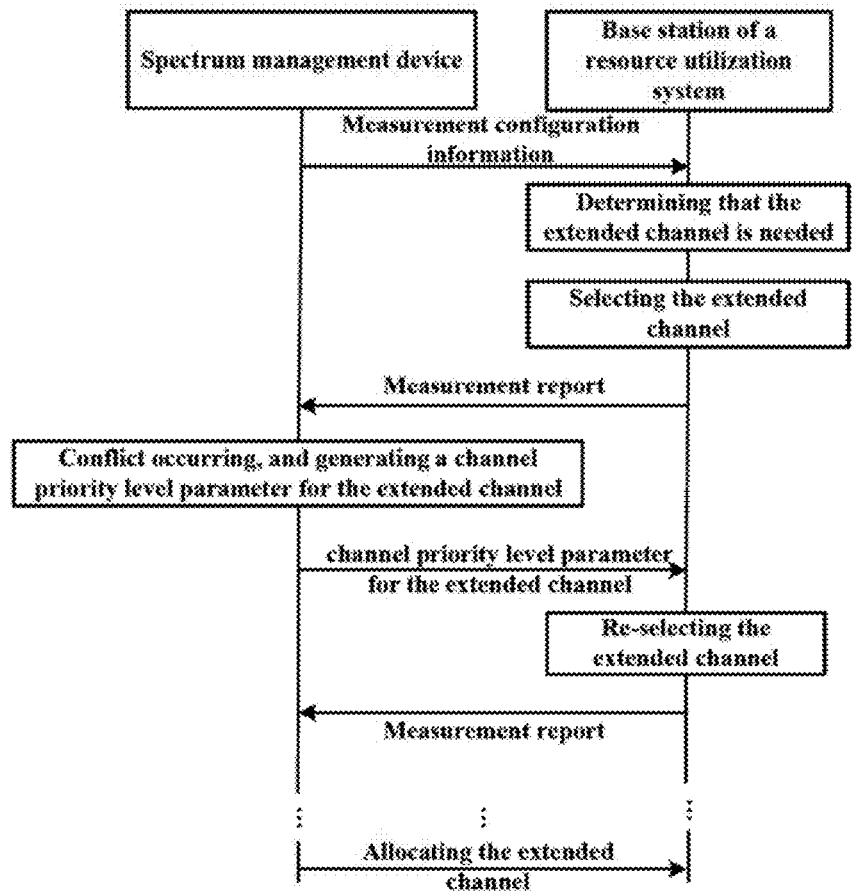
FIG. 8 shows an information procedure between a base station of a resource utilization system and a spectrum management device.

For ease of understanding, FIG. 8 shows an information procedure between a base station of a resource utilization system and a spectrum management device. As shown in FIG. 8, the spectrum management device sends to the base station measurement configuration information, which may include one or more of a channel priority level parameter, range of candidate channels, and the like. The base station of the resource utilization system judges whether an extended channel is needed based on a performance index, and determines that an extended channel is needed when the performance index meets a predetermined condition. Next, the base station selects an extended channel, and sends information of the selected extended channel as a measurement report to the spectrum management device. The measurement report may include one or more of an identifier of the extended channel, the number of times that the extended channel is selected, expected emission power, measured signal power on the extended channel, and the like. When detecting conflict of the extended channel, the spectrum management device generates a channel priority level parameter for the extended channel with respect to each resource utilization system involved in the conflict, and provides the channel priority level parameter to the corresponding resource utilization system. The resource utilization system performs re-selection of the extended channel based on the updated channel priority level parameter and reports information of the extended channel, until no conflict occurs. At this time, the spectrum management device assigns the extended channel requested by the resource utilization system to the resource utilization system.

The operations performed by the spectrum management device side and the base station side in FIG. 8 may be the same as described in this embodiment and the first embodiment, respectively, but are not limited thereto.

In summary, the electronic apparatus 200 according to the embodiment can realize dynamic assignment of extended channels, and can perform effective coordination in a case of conflict of extended channels among multiple resource utilization systems occurring, thereby reducing conflicts for channel contention and improving the spectrum utilization efficiency.

Third Embodiment

Figure 9:
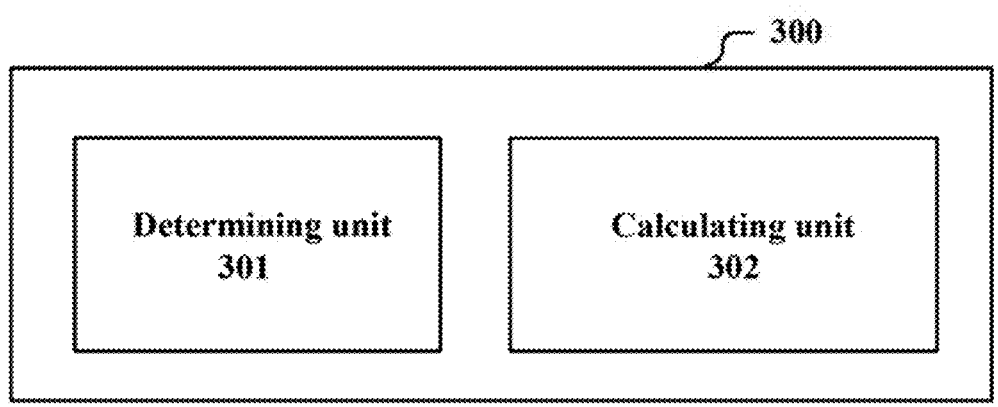
FIG. 9 is a block diagram showing function modules of an electronic apparatus for wireless communications according to another embodiment of the present disclosure.

FIG. 9 is a block diagram showing function modules of an electronic apparatus 300 for wireless communications according to another embodiment of the present disclosure. As shown in FIG. 9, the electronic apparatus 300 includes a determining unit 301 and a calculating unit 302. The determining unit 301 is configured to determine a distribution of spectrum extension performed by resource utilization systems managed by a spectrum management device within a predetermined period of time. The calculating unit 302 is configured to calculate, based on the distribution, a primary channel reassignment factor, for judging whether to perform reassignment of primary channels.

The determining unit 301 and the calculating unit 302 may be implemented by one or more processing circuitries. A processing circuitry may be implemented as a chip, for example.

The electronic apparatus 300 may be arranged, for example, on a central management device side or the spectrum management device side, or may be communicatively connected to the central management device or the spectrum management device. In addition, the electronic apparatus 300 may be arranged on the core network side. The central management device or spectrum management device described herein may be implemented as various functional entities, such as SAS, CxM or GSC in the above described CBRS architecture. In the CBRS architecture, it may also be configured that the SAS implements a part of the functions of the electronic apparatus 300, and the CxM implements another part of the functions of the electronic apparatus 300, and the like. It should be understood that these are not limiting.

It should also be noted that the electronic apparatus 300 may be implemented at the chip level, or may also be implemented at the device level. For example, the electronic apparatus 300 may operate as the central management device or the spectrum management device itself, and may also include external devices such as a memory, a transceiver (not shown in the figure). The memory may be used to store programs required to be executed by the central management device or the spectrum management device to realize various functions and related data information. The transceiver may include one or more communication interfaces to support communication with different devices (for example, a base station, another central management device or spectrum management device, user equipment, etc.), and the implementation of the transceiver is not specifically limited herein.

For example, when a resource utilization system within the management range frequently requests for spectrum extension, it may indicates that the assignment of the primary channel is unreasonable, and reassignment of primary channels may be necessary. This embodiment provides an electronic apparatus that evaluates the necessity of reassignment of the primary channels.

In a first example, the spectrum management device receives a request for extended channel from a resource utilization system, and performs spectrum extension for the resource utilization system in response to the request for extended channel. The determining unit 301 is configured to count the number of times that resource utilization systems perform spectrum extension within a predetermined period of time, as a distribution of the spectrum extension. In addition, the determining unit 301 is also configured to calculate a ratio of the weighted sum of the number of times that the resource utilization systems perform spectrum extension within the predetermined period of time to the duration of the predetermined period of time, as the primary channel reassignment factor, which is shown in the following equation (6).

$$\beta = \frac{\sum_{i \in N_{set}} \sum_{j \in N_{ver}} \theta^{i,j} N_{exp}^{i,j}}{T} \quad (6)$$

where β is the calculated primary channel reassignment factor, $N_{set}$ represents the number of connected sets in an interference overlapping map formed by the resource utilization systems within the management range of one spectrum management device, $N_{ver}$ represents the number of vertices (representing resource utilization systems) in each connected set, $N_{exp}$ represents the number of times that each vertex performs spectrum extension within time T, and θ represents a weight coefficient which may be set based on the importance of the user within the resource utilization system represented by the vertex, for example, the weight coefficient for a vertex corresponding to an ordinary user in a mall is smaller than the weight coefficient for a vertex corresponding to a user in an important meeting room.

It can be seen that the more the number of the resource utilization systems performing spectrum extension in the management range and the more frequently the spectrum extension is performed, the larger the primary channel reassignment factor, which indicates it is more necessary to reassign the primary channels. In this example, the determining unit 301 may also be configured to compare the primary channel reassignment factor with a predetermined threshold, and determine to perform reassignment of primary channels when the primary channel reassignment factor is greater than the predetermined threshold.

In this example, the spectrum management device may be a CxM, for example.

Figure 10:
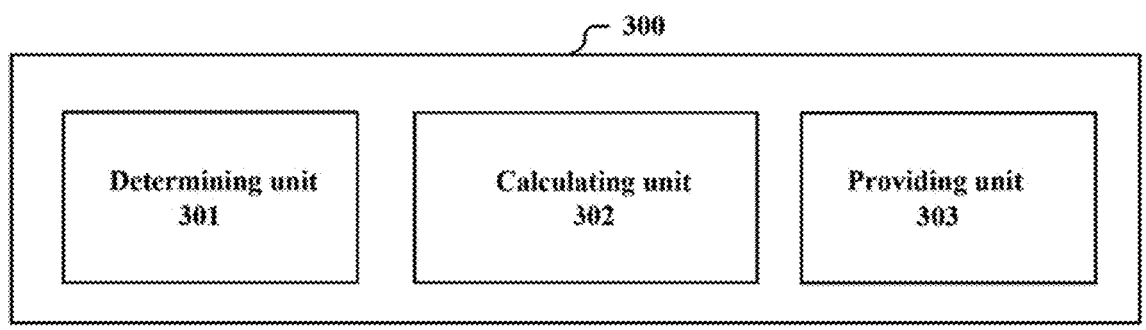
FIG. 10 is a block diagram showing function modules of an electronic apparatus for wireless communications according to another embodiment of the present disclosure.

In a second example, as shown in FIG. 10, the electronic apparatus 300 further includes a providing unit 303 configured to provide the primary channel reassignment factor to a second spectrum management device, so that the second spectrum management device determines, based on the primary channel reassignment factor and other primary channel reassignment factors from other spectrum management devices, whether to perform the reassignment of primary channels.

The providing unit 303 may also be configured to provide the primary channel reassignment factor to the second spectrum management device only when the primary channel reassignment factor is greater than the predetermined threshold.

In this example, the second spectrum management device manages multiple spectrum management devices including the present spectrum management device. The determination of whether to perform reassignment of primary channels made by the second spectrum management device involves reassignment of primary channels among management of the multiple spectrum management devices. For example, the multiple spectrum management devices each is a CxM, and the second spectrum management device is an SAS. The SAS determines to perform reassignment of primary channels among the CxMs when the number of CxMs whose primary channel reassignment factors are all greater than a predetermined threshold exceeds a predetermined number. Specifically, the SAS reassigns primary channel spectrum resources for each CxM, and each CxM reassigns primary channels for CBSDs under management based on the newly assigned primary channel spectrum resources.

In addition, in this example, the determining unit 301 may also be configured to determine whether to perform reassignment of primary channels based on the primary channel reassignment factor. That is, in a case that the second spectrum management device determines not to perform reassignment of primary channels among the spectrum management devices (for example, no primary channel reassignment response is received from the second spectrum management device), the present spectrum management device may perform reassignment of primary channels for the resource utilization systems under management based on existing primary channel spectrum resources.

In a third example, the determining unit 301 is configured to determine the distribution of the spectrum extension performed by the resource utilization system within the management range within a predetermined period of time by: receiving, from a plurality of third spectrum management devices within a management range of the spectrum management device, a distribution of spectrum extension performed by the resource utilization systems managed by the third spectrum management devices within the predetermined period of time. That is, the third spectrum management devices report their respective distribution of spectrum extension, so that the present spectrum management device determines a distribution of spectrum extension performed within its management range by summarizing the distribution of spectrum extension of all the third spectrum management devices.

The distribution of spectrum extension in this example may be, for example, the distribution of spectrum extension defined in the first example, or the primary channel reassignment factor defined in the first example.

The calculating unit 302 is configured to calculate a proportion of the third spectrum management devices whose distribution of spectrum extension satisfies a predetermined condition as the primary channel reassignment factor. For example, the proportion of the number of the third spectrum management devices whose distribution of spectrum extension exceeds a predetermined distribution may be calculated. In a case where the distribution of spectrum extension in this example is expressed by the primary channel reassignment factor defined in the first example, the primary channel reassignment factor in this example may be expressed as follows:

$$\gamma = \frac{N_{(\beta > \beta^{th})}}{N_M} \quad (7)$$

where $N_M$ is the number of the third spectrum management devices, and $N_{(\beta > \beta^{th})}$ is the number of the third spectrum management devices that need to perform reassignment of primary channels (that is, meet a predetermined condition).

The determining unit 301 is further configured to compare the primary channel reassignment factor calculated by the calculating unit 302 with a predetermined factor, and determine that all the third spectrum management devices within the management range of the spectrum management device are to perform reassignment of primary channels, when the primary channel reassignment factor is greater than the predetermined factor. For example, if the ratio $\gamma$ exceeds $\gamma^{th}$, the spectrum management device may perform reassignment of primary channels for all the third spectrum management devices within its management range.

In this example, the present spectrum management device may be an SAS, and the third spectrum management devices may be CxMs, for example. That is, the SAS acquires $\beta$ from multiple CxMs it manages, calculates a proportion $\gamma$ of CxMs that meets $\beta > \beta^{th}$, and performs reassignment of primary channels among CxMs when $\gamma > \gamma^{th}$, that is, reassigns primary channel spectrum resources among the CxMs, so that the CxMs can reassign the primary channels for CBSDs under management based on the newly assigned primary channel spectrum resources.

Figure 11:
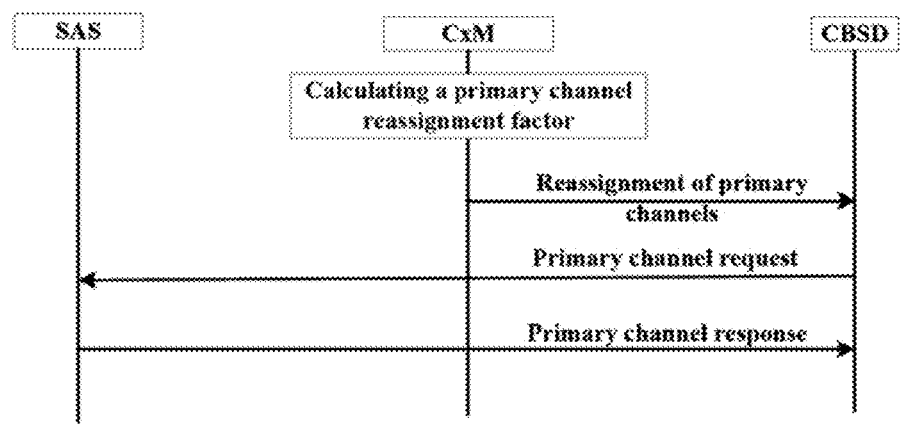
FIG. 11 shows an information procedure under an SAS shared framework according to a first example.

For ease of understanding, FIG. 11 shows an information procedure under an SAS shared framework according to the first example of the embodiment. As shown in FIG. 11, a CxM calculates the primary channel reassignment factor, and perform reassignment of primary channels on the CBSDs within the management range, when the primary channel reassignment factor is greater than a predetermined threshold. After receiving information of the newly assigned primary channel, the CBSD sends a request for the primary channel to the SAS and receives a primary channel response from the SAS. After receiving the primary channel response from the SAS, the CBSD may use the newly assigned primary channel for communication.

Figure 12:
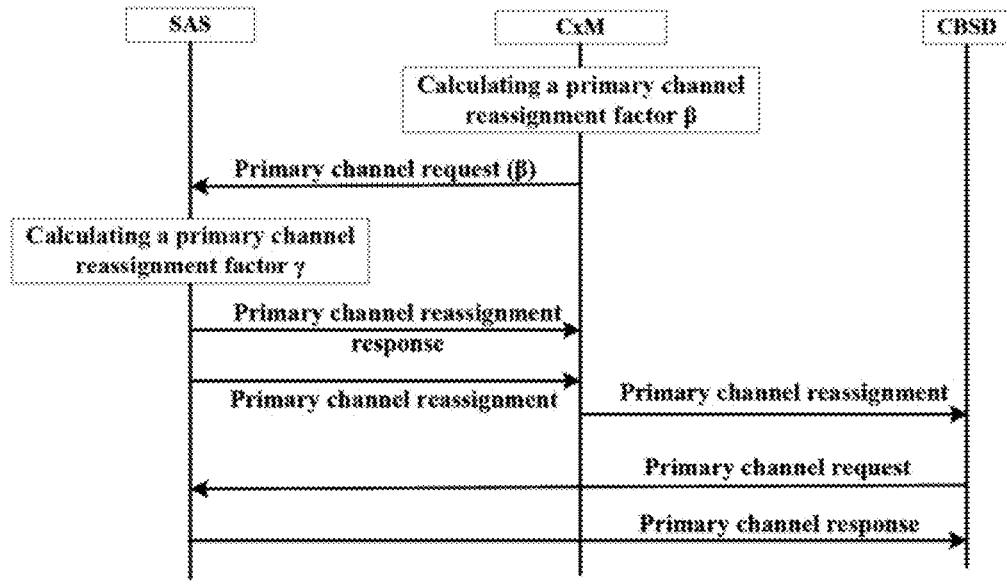
FIG. 12 shows an information procedure under an SAS shared framework according to a second example and a third example.

FIG. 12 shows an information procedure under an SAS shared framework according to a second example and a third example of the embodiment. As shown in FIG. 12, a CxM calculates the primary channel reassignment factor $\beta$ and sends it to an SAS (via a primary channel reassignment request, for example). The SAS calculates its primary channel reassignment factor $\gamma$ based on the multiple $\beta$ from multiple CxMs, and determines to perform reassignment of primary channels when $\gamma$ meets a predetermined condition, sends a primary channel reassignment response to the CxM and performs reassignment of primary channels. Then, the CxM performs reassignment of primary channels on the CBSDs under management based on the newly assigned primary channel spectrum resources. Similarly, upon receiving information of the newly assigned primary channel, the CBSD sends a request for the primary channel to the SAS and receives a primary channel response from the SAS. Upon receiving the primary channel response from the SAS, the CBSD may use the newly assigned primary channel for communication.

In summary, the electronic apparatus 300 according to the embodiment can determine, based on overall conditions of spectrum extension, whether to perform a primary channel reassignment, thereby improving the effectiveness of spectrum assignment.

Fourth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 13:
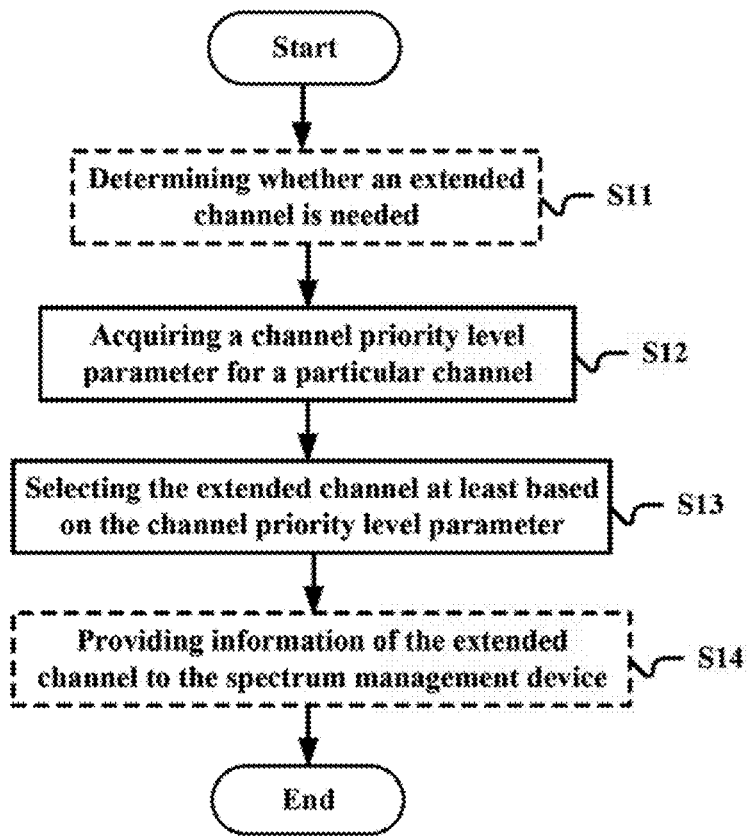
FIG. 13 is a flow chart of a method for wireless communications according to an embodiment of the present disclosure.

FIG. 13 is a flow chart of a method for wireless communications according to an embodiment of the present disclosure. The method includes: acquiring, from a spectrum management device, a channel priority level parameter for a particular channel (S12), the channel priority level parameter being used for indicating a priority level at which the particular channel is used by a resource utilization system as an extended channel; and selecting, at least based on the channel priority level parameter, an extended channel of the resource utilization system (S13). The method, for example, may be performed on the base station side of a resource utilization system.

In step S13, a channel evaluation value for the particular channel may be updated, for example, at least with a channel priority level parameter for the particular channel, and an extended channel may be selected based on the channel evaluation value, the channel evaluation value indicating performance of the particular channel serving as the extended channel. For example, the channel evaluation value for the particular channel may at least involve the interference evaluation for the particular channel, and may also involve the historical selection frequency that the particular channel is selected as the extended channel. At least part of the channel evaluation value for a particular channel may be weighted by the channel priority level parameter for the particular channel. In step S13, an extended channel is selected from among multiple candidate channels that may serve as an extended channel. Initially, the channel priority level parameter for each candidate channel may be initialized to a predetermined value.

As shown by a dashed line block in FIG. 13, the above method may further include a step S14: providing information of the selected extended channel to a spectrum management device. In addition, in a case that the selected extended channel conflicts with an extended channel selected by another resource utilization system, the above method further includes a step of acquiring an updated channel priority level parameter for the selected extended channel from the spectrum management device (that is, step S12 is repeated). In step S13, the extended channel is selected based on the updated channel priority level parameter, until the selected extended channel does not conflict with the extended channels selected by other resource utilization systems.

For example, in step S14, one or more of the following may be further provided to the spectrum management device: expected emission power of the resource utilization system, the historical number of times that the selected extended channel is selected, and measured signal power of the resource utilization system on the selected extended channel.

As an example, in step S13, the extended channel may be selected using the MAB algorithm. Specifically, a reward value of a candidate channel in the algorithm is determined by measuring the signal power on the candidate channel, a channel evaluation value for the candidate channel is calculated based on the reward value, the frequency that the candidate channel is selected and the channel priority level parameter for the candidate channel, and an extended channel is selected based on the channel evaluation values. The channel evaluation value indicates performance of the candidate channel serving as an extended channel. For example, in each subsequent loop except for the initialization stage of the MAB algorithm, only the signal power of the candidate channel with the largest channel evaluation value in the current loop is measured for calculating channel evaluation value in the next loop. The candidate channel with the largest channel evaluation value in the last loop is selected as the extended channel. It is noted that one arm in the MAB algorithm may correspond to one candidate channel, or may correspond to multiple candidate channels.

As another example, in step S13, an extended channel may be selected by sorting, using a sorting algorithm, updated channel evaluation value for the particular channel and channel evaluation values for candidate channels that may serve as the extended channel.

In addition, information about change status of network may also be acquired from the spectrum management device, and an operation manner for reselecting the extended channel may be determined based on the information.

As shown in another dashed line block in FIG. 13, the above method may further include a step S11 of determining whether the resource utilization system needs an extended channel. An operation of selecting the extended channel is performed when it is determined that the resource utilization system needs an extended channel.

For example, in step S11, the determination may be performed based on communication quality and spectrum satisfaction degree of the resource utilization system. The resource utilization system may be determined to need an extend channel in the following situation: a weighted sum of the spectrum satisfaction degree and the communication quality being lower than a predetermined threshold; and the duration of the state in which the weighted sum is lower than the predetermined threshold exceeding a predetermined duration.

In addition, candidate channels may be determined in one of the following manners: determining the candidate channels based on an instruction from the spectrum management device; determining a predetermined number of channels on both sides centered on a primary channel of the resource utilization system as the candidate channels; and determining all channels available to the spectrum management device other than the primary channel, as the candidate channels.

Figure 14:
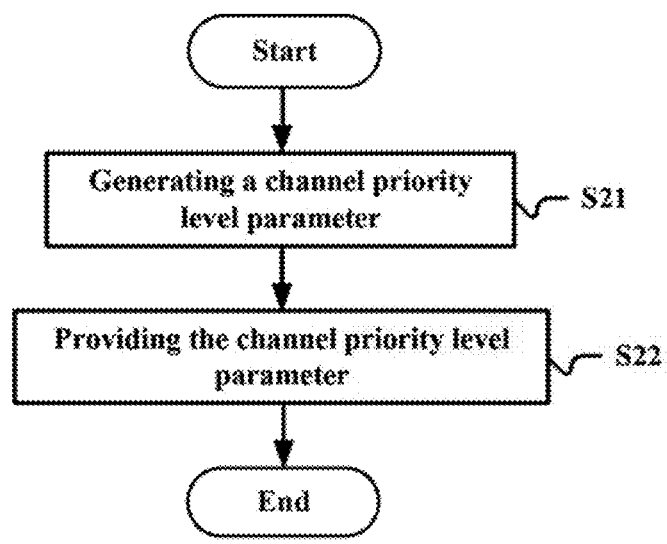
FIG. 14 is a flow chart of a method for wireless communications according to another embodiment of the present disclosure.

FIG. 14 is a flow chart of a method for wireless communications according to another embodiment of the present disclosure. The method includes: generating, in a case that there is conflict between extended channels requested by two or more resource utilization systems with interfering relationship therebetween within a management range of a spectrum management device, a channel priority level parameter for the extended channel subjected to the conflict for the two or more resource utilization systems, respectively (S21), wherein the channel priority level parameter is used to indicate a priority level at which the extended channel is used by a corresponding resource utilization system; and providing the channel priority level parameter to the corresponding resource utilization system (S22). The method may be implemented on the spectrum management device side.

For example, in step S21, a channel priority level parameter for each of two or more resource utilization systems may be generated based on one or more of the following: a random factor, a degree of requirement for the extended channel by the resource utilization system, channel continuity between the extended channel and a primary channel of the resource utilization system, and communication quality of the resource utilization system on the extended channel.

The degree of requirement for the extended channel by a resource utilization system may be represented by a ratio of the historical number of times that the resource utilization system selects the extended channel to a sum of respective historical numbers of times that the two or more resource utilization systems respectively select the extended channel. The two or more resource utilization systems are also referred to as a sub-connected set. The channel continuity between the extended channel and a primary channel of a resource utilization system may be represented by a frequency interval between the extended channel and the primary channel. The communication quality of the resource utilization system on the extended channel may be represented by a ratio of the expected emission power of the resource utilization system to the measured signal power of the resource utilization system on the extended channel.

Besides, although not shown in FIG. 14, the method may further include a step of receiving, from a resource utilization system, a request for extended channel, which includes information of the channel that is selected as the extended channel by the resource utilization system. For example, the request for extended channel may also include one or more of the following: expected emission power of the resource utilization system, the historical number of times that the extended channel is selected, and measured signal power of the resource utilization system on the extended channel.

In addition, the spectrum management device may further provide the resource utilization system with an indication of the range of candidate channels that may serve as the extended channel. In step S22, the resource utilization system may also be provided with information about a change status of network.

Figure 15:
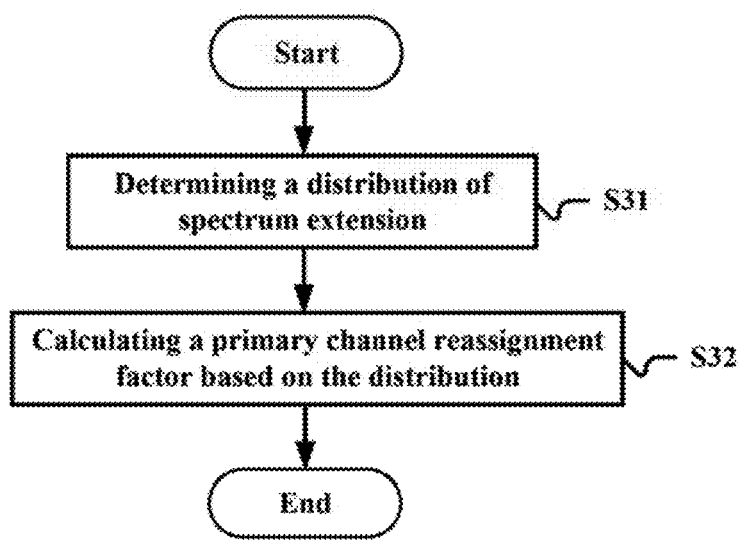
FIG. 15 is a flow chart of a method for wireless communications according to another embodiment of the present disclosure.

FIG. 15 is a flow chart of a method for wireless communications according to another embodiment of the present disclosure. The method includes: determining a distribution of spectrum extension performed by resource utilization systems managed by a spectrum management device within a predetermined period of time (S31); and calculating, based on the distribution, a primary channel reassignment factor, for judging whether to perform reassignment of primary channels (S32).

In an example, in step S31, the number of times that the resource utilization systems perform spectrum extension within the predetermined period of time is counted as a distribution of spectrum extension. In step S32, a ratio of the weighted sum of the number of times that the resource utilization systems perform spectrum extension within the predetermined period of time to the duration of the predetermined period of time is calculated as the primary channel reassignment factor. For example, the weight for each resource utilization system may be set based on the importance of its users. In addition, although not shown in FIG. 15, the method may further include a step of comparing the primary channel reassignment factor with a predetermined threshold, and determining to perform reassignment of primary channels when the primary channel reassignment factor is greater than the predetermined threshold.

In another example, the method further includes: providing the primary channel reassignment factor to a second spectrum management device, so that the second spectrum management device determines whether to perform reassignment of primary channels based on the primary channel reassignment factor and other primary channel reassignment factors from other spectrum management devices. For example, the primary channel reassignment factor may be provided to the second spectrum management device only when the primary channel reassignment factor is greater than the predetermined threshold. In this example, the method may further include a step of determining whether to perform reassignment of primary channels based on the primary channel reassignment factor.

In yet another example, the method may further include: receiving, from multiple third spectrum management devices within the management range of the spectrum management device, a distribution of spectrum extension performed by the resource utilization systems managed by the third spectrum management devices within a predetermined period of time; and calculating a proportion of the number of the third spectrum management devices whose distribution of spectrum extension satisfies a predetermined condition, as the primary channel reassignment factor. In addition, the primary channel reassignment factor may be compared with a predetermined factor, and it may be determined that all the third spectrum management devices within the management range of the spectrum management device are to perform reassignment of primary channels when the primary channel reassignment factor is greater than the predetermined factor.

Note that the above methods may be used in combination with each other or individually, which have been described in detail in the first to third embodiments and will not be repeated herein.

Furthermore, for better understanding of the present disclosure, two simulation examples are given below for the purpose of illustration rather than limitation.

Figure 16:
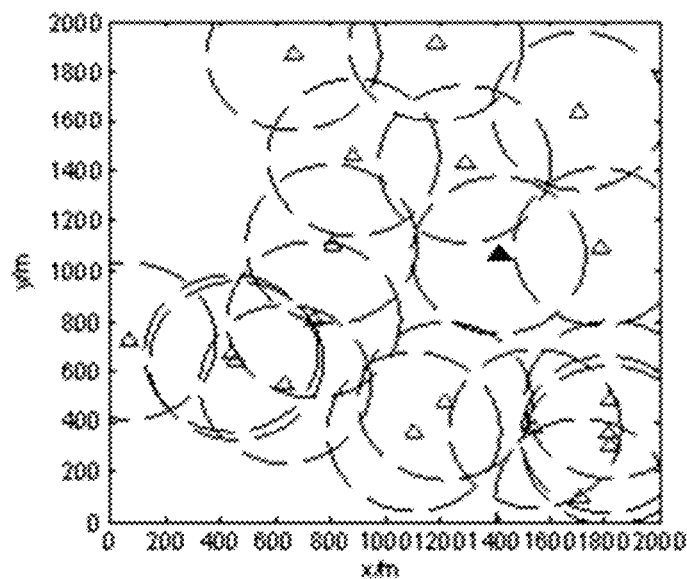
FIG. 16 is a schematic diagram of a scenario for a simulation example.
Figure 17:
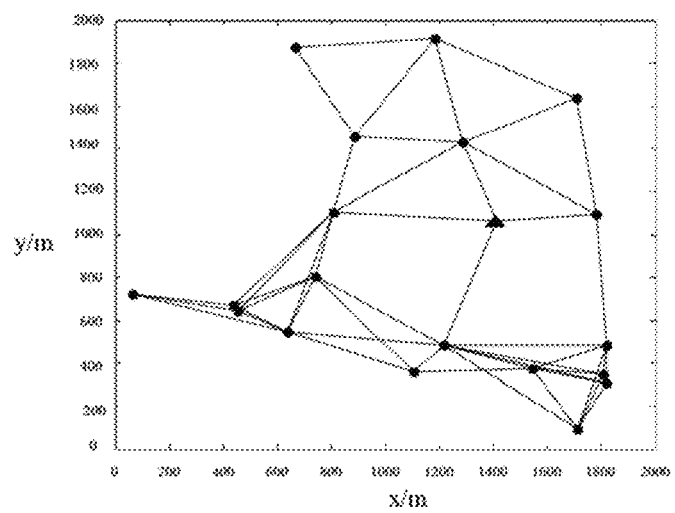
FIG. 17 is an interference overlapping map corresponding to the simulation scenario in FIG. 16.

The first simulation is performed for the scenario shown in FIG. 16. In a simulation area of 2000 m×2000 m, 20 CBSDs are randomly distributed. Each of the CBSDs has emission power of 10 dBm, and an operating frequency of 3.6 GHz. The receiver sensitivity is −96 dBm, and the radio wave propagation path-loss coefficient in the wireless environment is 2.5. FIG. 17 shows an interference overlapping map constructed based on the interfering relationship among CBSDs in the scenario. In this simulation, there is only one CBSD requesting for an extended channel at the same time, and the CBSD is represented by a solid triangle in FIG. 16 and FIG. 17.

Figure 18:
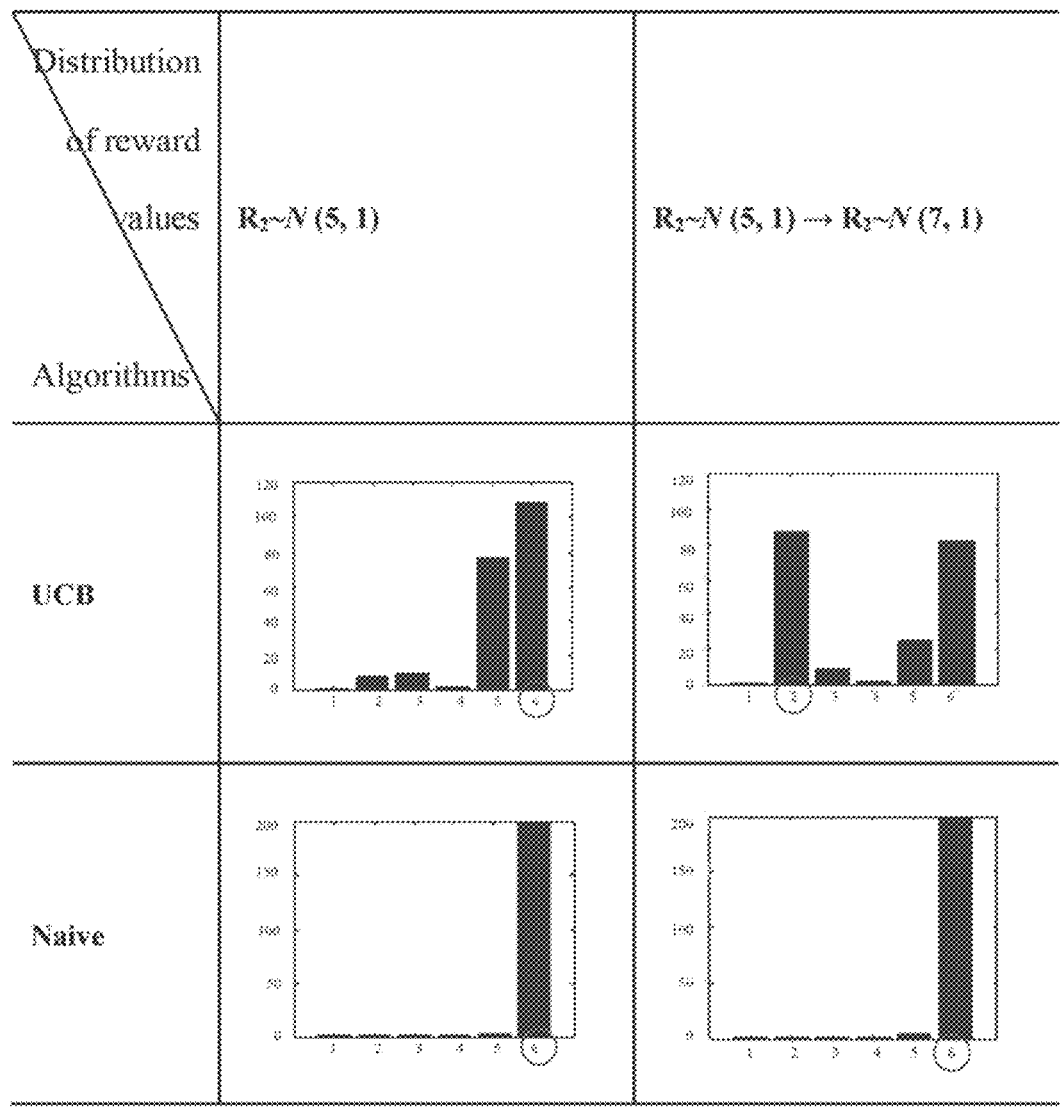
FIG. 18 is a diagram of a simulation result of a simulation example.

After coloring the simulation scenario, it is found that a total of 6 primary channels are required, and the primary channel of the CBSD that needs to perform spectrum extension is channel 1. FIG. 18 shows a comparison of the distribution of the extended channels selected in each loop when applying the MAB algorithm and the Naïve algorithm respectively. The MAB algorithm specifically uses the upper confidence bound (UCB) algorithm. As for the Naïve algorithm, the channel with the highest reward value is selected as the extended channel in each loop. In the simulation, both algorithms were executed with 200 loops.

The second column shows a comparison of the distribution of extended channels selected by the two algorithms under the condition that the distribution of reward values on respective channels does not change. The horizontal axis of the histogram indicates channel 1 to channel 6, and the vertical axis of the histogram indicates times the channel is selected as the extended channel. It can be seen that the two algorithms both select channel 6 for the most times.

The third column shows a comparison of the distribution of extended channels selected by the two algorithms under the condition that the distribution of reward values on respective channels changes (the average reward value of channel 2 becomes higher during the execution of the algorithm). It can be seen that the times the channel 2 is selected by the UCB algorithm increases significantly, while the distribution of selection results for the Naïve algorithm remains substantially unchanged.

The distribution of reward values on the channels represents a distribution of load. The comparison of the simulations in the two cases shows that the UCB algorithm is more suitable for a scenario with dynamic load changes.

Figure 19:
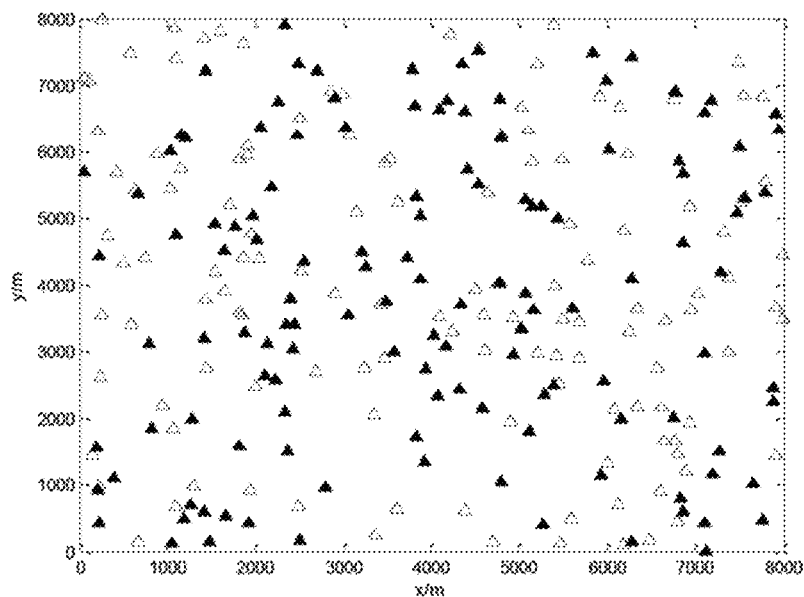
FIG. 19 is a schematic diagram of a scenario for another simulation example.
Figure 20:
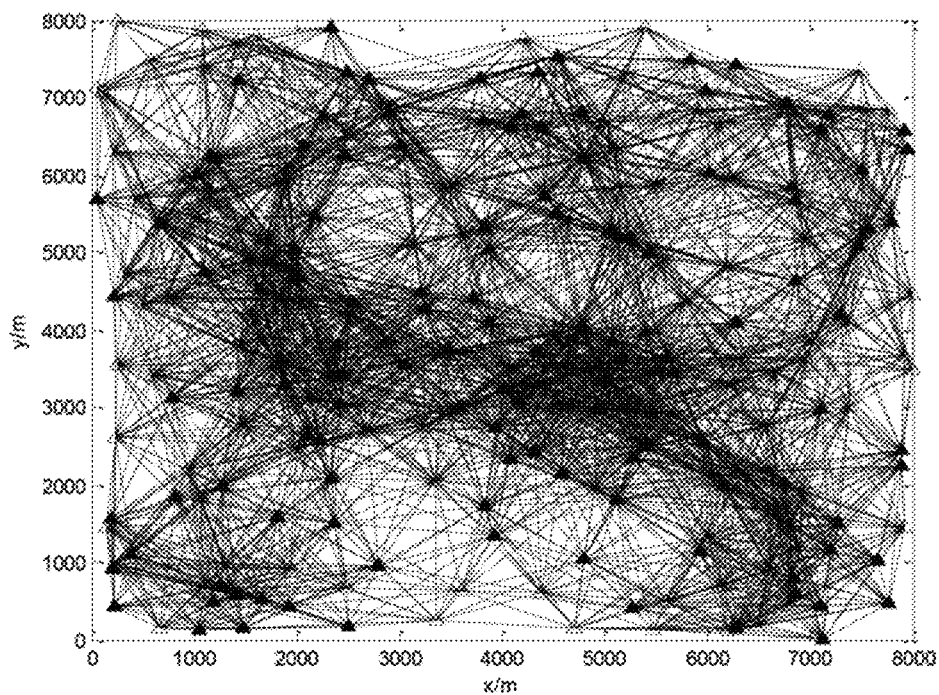
FIG. 20 is an interference overlapping map corresponding to the simulation scenario in FIG. 19.

The second simulation is performed for the scenario shown in FIG. 19. In a simulation area of 8000 m×8000 m, 260 CBSDs are randomly distributed. Each of the CBSDs has emission power of 10 dBm, and a frequency of 3.6 GHz. The receiver sensitivity is −96 dBm, and the path-loss coefficient in the environment is 2.1. FIG. 20 shows an interference overlapping map constructed based on the interfering relationship among CBSDs in a scenario. In this simulation, there are multiple CBSDs requesting for extended channels at the same time. The CBSDs (the number of which is 130) that need spectrum extension are represented by solid triangles in FIG. 19 and FIG. 20.

Figure 21:
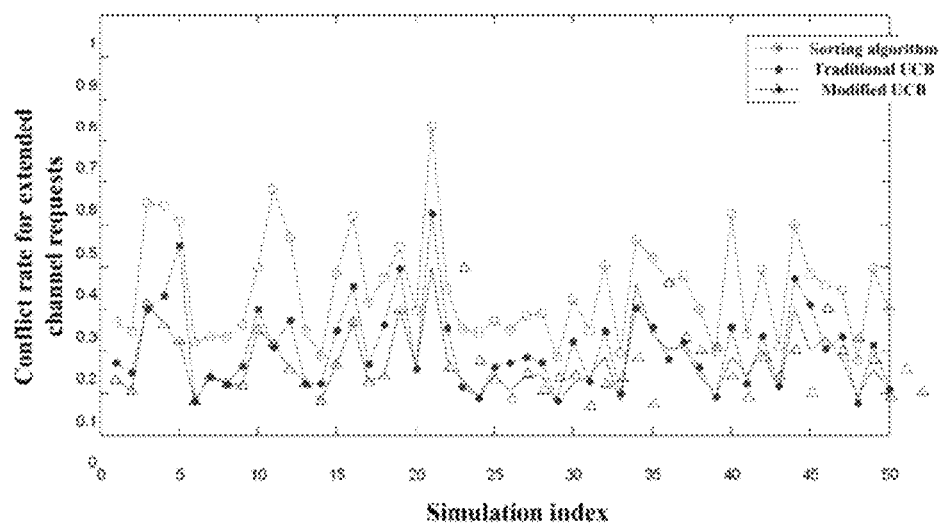
FIG. 21 is a diagram of a simulation result of another simulation example.

In this simulation, 50 loops were performed, and the results are shown in FIG. 21. FIG. 21 shows comparison curves of conflict rates of extended channel requests for three algorithms. The three algorithms are sorting algorithm (as described in the first embodiment), traditional UCB algorithm (using the Q value shown in equation (1), where $\delta_j$ is equal to 1 for each channel), and modified UCB algorithm (using the Q value shown in equation (1), where each channel is set with $\delta_j$), respectively. It can be seen from the simulation curves in FIG. 21 that the traditional UCB algorithm may significantly reduce the conflict rate of channel requests, and the modified UCB algorithm may further reduce the conflict rate of channel requests.

The technology according to the present disclosure is applicable to various products.

For example, the electronic apparatus 200 and 300 may be implemented as any type of server, such as a tower server, a rack server, and a blade server. The electronic apparatus 200 and 300 may be a control module (such as an integrated circuitry module including a single die, and a card or blade inserted into a slot of a blade server) mounted on a server.

For example, the electronic apparatus 100 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communications; and one or more remote radio head ends (RRH) located at positions different from the main body. In addition, various types of user equipments may each serve as a base station by performing functions of the base station temporarily or semi-permanently.

[Exemplary Application Regarding a Server]

Figure 22:
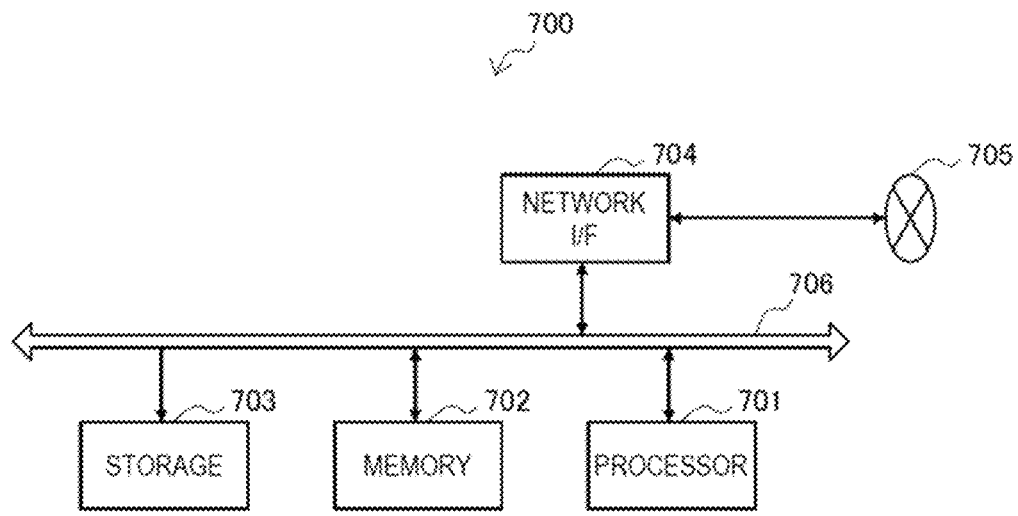
FIG. 22 is a block diagram showing an example of a schematic configuration of a server to which the technology of the present disclosure may be applied.

FIG. 22 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be, for example, a central processing unit (CPU) or a digital signal processor (DSP), and controls functions of the server 700. The memory 702 includes random access memory (RAM) and read only memory (ROM), and stores data and programs executed by the processor 701. The storage 703 may include a storage medium, such as a semiconductor memory and a hard disk.

The network interface 704 is a communication interface for connecting the server 700 to a communication network 705. The communication network 705 may be a core network such as an evolved packet core network (EPC) or a packet data network (PDN) such as the Internet.

The processor 701, the memory 702, the storage 703, and the network interface 704 are connected to each other via a bus 706. The bus 706 may include two or more buses (such as a high-speed bus and a low-speed bus) having different speeds.

In the server 700 shown in FIG. 22, the generating unit 201, the providing unit 202, and the receiving unit 203 described with reference to FIG. 7, the determining unit 301 and the calculating unit 302 described with reference to FIGS. 9 and 10, the providing unit 303 described with reference to FIG. 10, and the like, may be implemented by the processor 701. For example, the processor 701 may realize the generation and provision of channel priority level parameter by performing functions of the generating unit 201, the providing unit 202 and the receiving unit 203, and realize the calculation and provision of a primary channel reassignment factor and the determination of reassignment of primary channels by performing the functions of the determining unit 301, the calculating unit 302 and the providing unit 303.

[Exemplary Application Regarding a Base Station]

First Application Example

Figure 23:
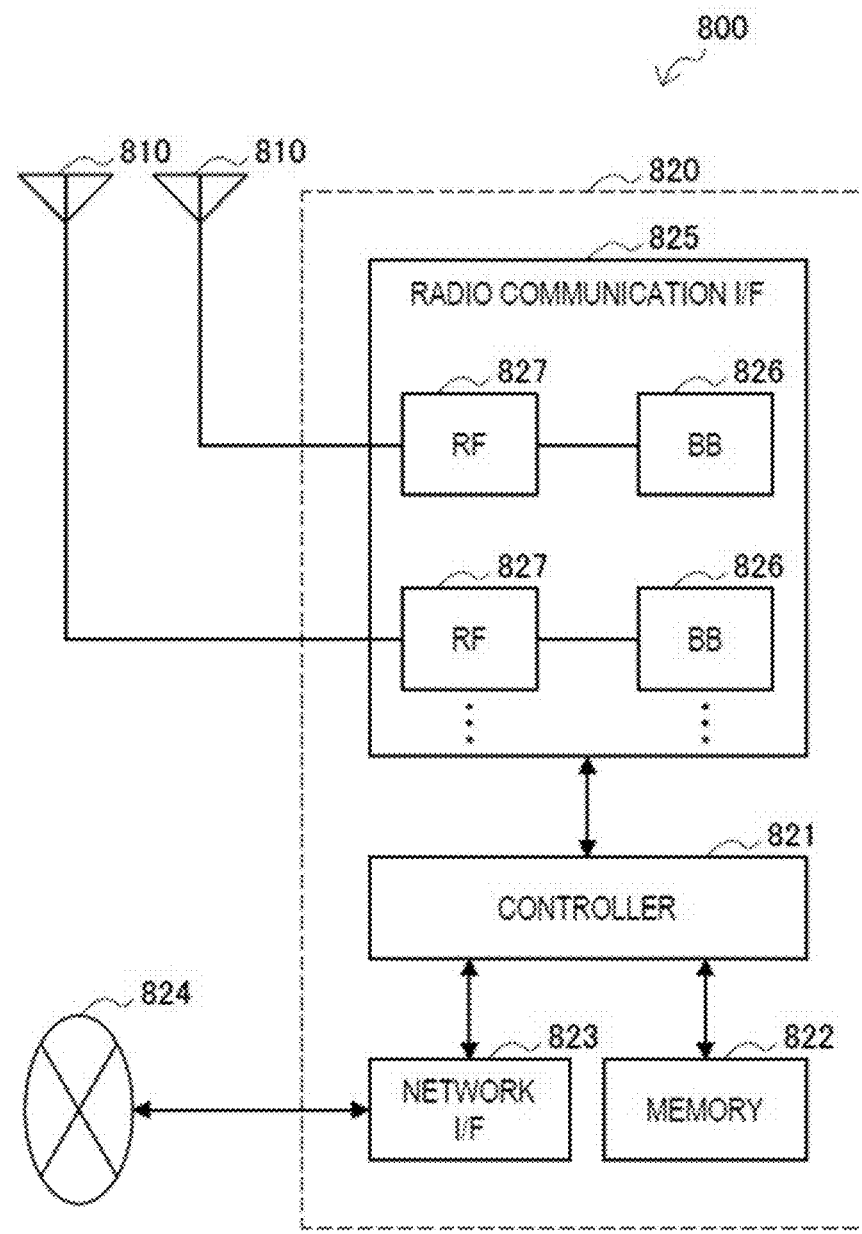
FIG. 23 is a block diagram showing a first example of an exemplary configuration of an eNB or gNB to which the technology according to the present disclosure may be applied.

FIG. 23 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 23, the eNB 800 may include the multiple antennas 810. For example, the multiple antennas 810 may be compatible with multiple frequency bands used by the eNB 800. Although FIG. 23 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 23, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 23. For example, the multiple RF circuits 827 may be compatible with multiple antenna elements. Although FIG. 23 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 23, a transceiver of the electronic apparatus 100 may be implemented by the radio communication interface 825. At least part of the functions may also be implemented by the controller 821. For example, the controller 821 may realize acquisition of the channel priority level parameter and selection of an extended channel based on the channel priority level parameter by performing the functions of the acquiring unit 101 and the selecting unit 102, realize provision of information of the selected extended channel to a spectrum management device by performing the functions of the providing unit 103, and determine whether an extended channel is required by performing the functions of the judging unit 104.

Second Application Example

Figure 24:
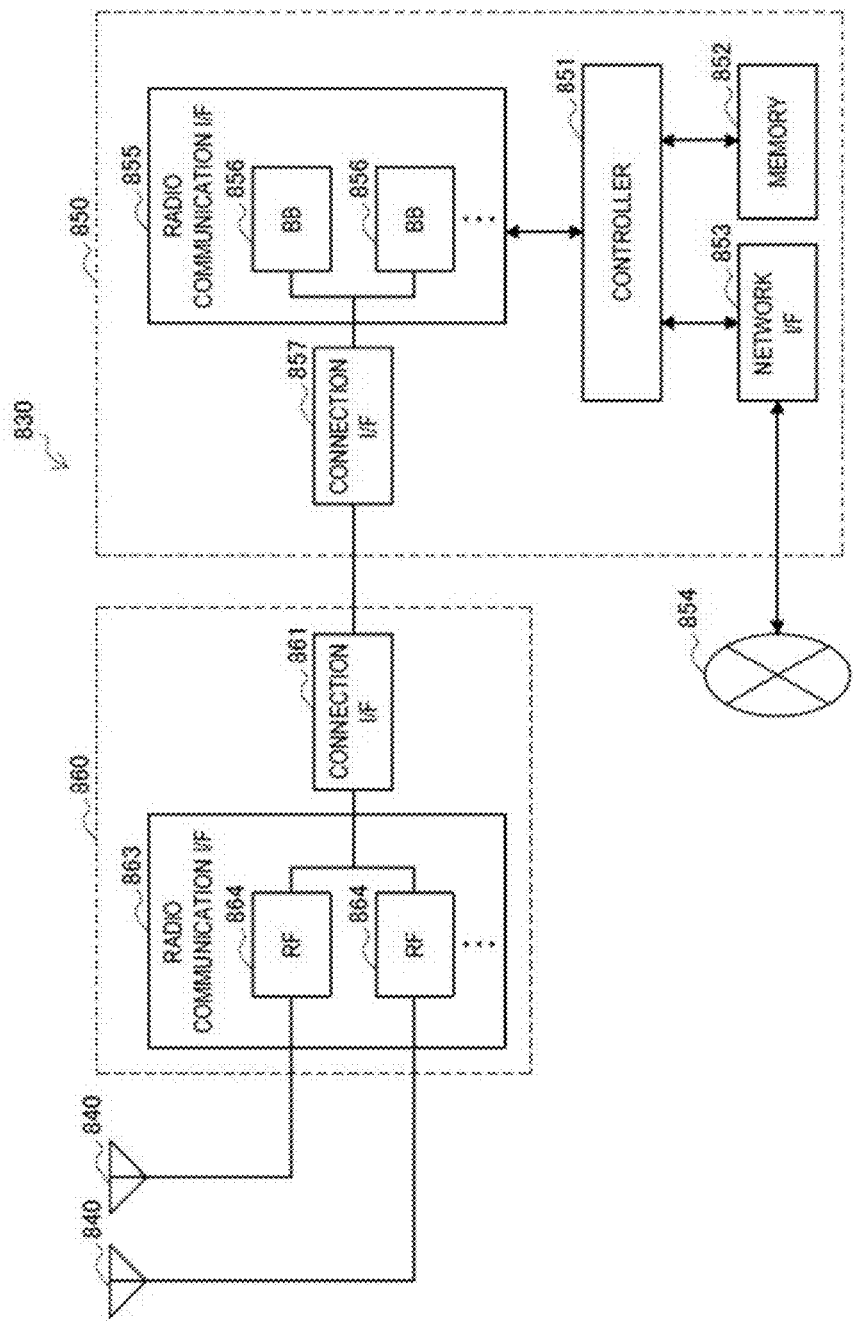
FIG. 24 is a block diagram showing a second example of an exemplary configuration of an eNB or gNB to which the technology according to the present disclosure may be applied.

FIG. 24 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 24, the eNB 830 may include the multiple antennas 840. For example, the multiple antennas 840 may be compatible with multiple frequency bands used by the eNB 830. Although FIG. 24 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except that the BB processor 856 is connected to an RF circuit 864 of the RRH 860 via the connection interface 857. As show in FIG. 24, the radio communication interface 855 may include the multiple BB processors 856. For example, the multiple BB processors 856 may be compatible with multiple frequency bands used by the eNB 830. Although FIG. 24 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 24. For example, the multiple RF circuits 864 may support multiple antenna elements. Although FIG. 24 shows the example in which the radio communication interface 863 includes the multiple RF circuits 864, the radio communication interface 863 may also include a single RF circuit 864.

In the eNB 830 shown in FIG. 24, a transceiver of the electronic apparatus 100 may be implemented by the radio communication interface 855 and/or radio communication interface 863. At least part of the functions may also be implemented by the controller 851. For example, the controller 851 may realize acquisition of the channel priority level parameter and selection of an extended channel based on the channel priority level parameter by performing the functions of the acquiring unit 101 and the selecting unit 102, realize provision of information of the selected extended channel to a spectrum management device by performing the functions of the providing unit 103, and determine whether an extended channel is required by performing the functions of the judging unit 104.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2500 shown in FIG. 25) from a storage medium or network, wherein the computer is capable of implementing various functions when installed with various programs.

Figure 25:
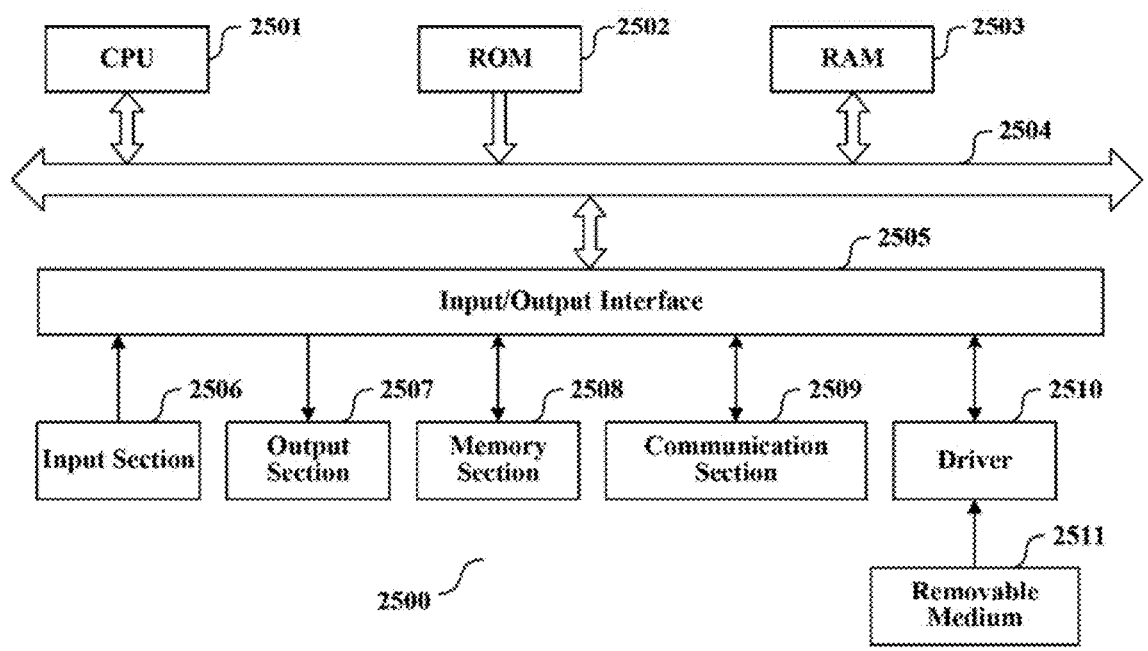
FIG. 25 is a block diagram of an exemplary block diagram illustrating the structure of a general purpose personal computer capable of realizing the method and/or device and/or system according to the embodiments of the present disclosure.

In FIG. 25, a central processing unit (CPU) 2501 executes various processing according to a program stored in a read-only memory (ROM) 2502 or a program loaded to a random access memory (RAM) 2503 from a memory section 2508. The data needed for the various processing of the CPU 2501 may be stored in the RAM 2503 as needed. The CPU 2501, the ROM 2502 and the RAM 2503 are linked with each other via a bus 2504. An input/output interface 2505 is also linked to the bus 2504.

The following components are linked to the input/output interface 2505: an input section 2506 (including keyboard, mouse and the like), an output section 2507 (including displays such as a cathode ray tube (CRT), a liquid crystal display (LCD), a loudspeaker and the like), a memory section 2508 (including hard disc and the like), and a communication section 2509 (including a network interface card such as a LAN card, modem and the like). The communication section 2509 performs communication processing via a network such as the Internet. A driver 2510 may also be linked to the input/output interface 2505, if needed. If needed, a removable medium 2511, for example, a magnetic disc, an optical disc, a magnetic optical disc, a semiconductor memory and the like, may be installed in the driver 2510, so that the computer program read therefrom is installed in the memory section 2508 as appropriate.

In the case where the foregoing series of processing is achieved through software, programs forming the software are installed from a network such as the Internet or a memory medium such as the removable medium 2511.

It should be appreciated by those skilled in the art that the memory medium is not limited to the removable medium 2511 shown in FIG. 25, which has program stored therein and is distributed separately from the apparatus so as to provide the programs to users. The removable medium 2511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2502 and the memory section 2508 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
    processing circuitry, configured to:
    acquire, from a spectrum management device, a channel priority level parameter for a particular channel, the channel priority level parameter being used for indicating a priority level at which the particular channel is used by a resource utilization system as an extended channel; and
    select, at least based on the channel priority level parameters, an extended channel for the resource utilization system,
    wherein, the processing circuitry is further configured to update a channel evaluation value for the particular channel at least with the channel priority level parameter for the particular channel, and select the extended channel based on the channel evaluation value, the channel evaluation value indicating performance of the particular channel serving as the extended channel.

2. The electronic apparatus according to claim 1, wherein, the processing circuitry is further configured to provide information of the selected extended channel to the spectrum management device, and acquire from the spectrum management device, in a case that the selected extended channel conflicts with the extended channel selected by another resource utilization system, an updated channel priority level parameter for the selected extended channel.

3. The electronic apparatus according to claim 2, wherein, the processing circuitry is further configured to select the extended channel, at least based on the updated channel priority level parameter, until the selected extended channel does not conflict with the extended channel selected by another resource utilization system.

4. The electronic apparatus according to claim 2, wherein the processing circuitry is configured to select the extended channel using a multi-armed bandit algorithm, in which, the processing circuitry determines a reward value of a candidate channel in the algorithm by measuring a signal power on the candidate channel, calculates the channel evaluation value for the candidate channel based on the reward value, the frequency at which the candidate channel is selected, and the channel priority level parameter for the candidate channel, and selects the extended channel based on the channel evaluation value.

5. The electronic apparatus according to claim 2, wherein the processing circuitry is further configured to provide the spectrum management device with one or more of the following: expected emission power of the resource utilization system, the historical number of times that the selected extended channel is selected, and measured signal power of the resource utilization system on the selected extended channel.

6. The electronic apparatus according to claim 1, wherein, the processing circuitry is further configured to initialize the channel priority level parameter for each of a plurality of candidate channels that can serve as extended channels to a predetermined value.

7. The electronic apparatus according to claim 1, wherein, the processing circuitry is further configured to determine whether the resource utilization system needs an extended channel.

8. The electronic apparatus according to claim 7, wherein, the processing circuitry is further configured to determine whether the resource utilization system needs an extended channel based on communication quality and spectrum satisfaction degree of the resource utilization system, wherein the processing circuitry is configured to determine that the resource utilization system needs an extended channel in the following situation: a weighted sum of the spectrum satisfaction degree and the communication quality being lower than a predetermined threshold, and the duration of the state in which the weighted sum is lower than the predetermined threshold exceeding a predetermined duration.

9. The electronic apparatus according to claim 1, wherein the processing circuitry is configured to select the extended channel from among candidate channels that can serve as an extended channel, and determine the candidate channels in one of the following manners: determining the candidate channels based on an instruction from the spectrum management device; determining a predetermined number of channels on both sides centered on a primary channel of the resource utilization system as the candidate channels; and determining all channels available to the spectrum management device other than the primary channel, as the candidate channels.

10. The electronic apparatus according to claim 1, wherein the channel evaluation value for the particular channel at least involves an interference evaluation for the particular channels, or wherein the channel evaluation value for the particular channel further involves a historical selection frequency that the particular channel is selected as the extended channel, or wherein at least part of the channel evaluation value for the particular channel is weighted by the channel priority level parameter for the particular channel.

11. An electronic apparatus for wireless communications, comprising:

processing circuitry, configured to:

generate, in a case that there is conflict between extended channels requested by two or more resource utilization systems with interfering relationship therebetween within a management range of a spectrum management device, a channel priority level parameter for the extended channel subjected to the conflict for the two or more resource utilization systems, respectively, wherein the channel priority level parameter is used to indicate a priority level at which the extended channel is used by a corresponding resource utilization system; and provide the channel priority level parameter to the corresponding resource utilization system.

12. The electronic apparatus according to claim 11, wherein, the processing circuitry is further configured to generate the channel priority level parameter for each of the two or more resource utilization systems, based on one or more of the following: a random factor, a degree of requirement for the extended channel by the resource utilization system, channel continuity between the extended channel and a primary channel of the resource utilization system, and communication quality of the resource utilization system on the extended channel.

13. The electronic apparatus according to claim 12, wherein the degree of requirement for the extended channel by the resource utilization system is represented by a ratio of the historical number of times that the resource utilization system selects the extended channel to a sum of respective historical number of times that the two or more resource utilization systems select the extended channel, wherein the channel continuity between the extended channel and a primary channel of the resource utilization system is represented by a frequency interval between the extended channel and the primary channel, wherein the communication quality of the resource utilization system on the extended channel is represented by a ratio of the expected emission power of the resource utilization system to the measured signal power of the resource utilization system on the extended channel.

14. The electronic apparatus according to claim 11, wherein, the processing circuitry is further configured to receive, from a resource utilization system, a request for extended channel, which includes information of a channel that is selected as the extended channel by the resource utilization system.

15. The electronic apparatus according to claim 11, wherein the processing circuitry is further configured to provide the resource utilization system with one or more of the following: an indication of the range of candidate channels that can serve as an extended channel; information about a change status of network.

* * * * *